(12) United States Patent
Landsmann et al.

(10) Patent No.: US 11,641,172 B2
(45) Date of Patent: May 2, 2023

(54) METHOD AND DEVICE FOR LOAD-FREE DETERMINING OF LOAD-DEPENDENT POSITIONING PARAMETERS OF A SYNCHRONOUS MACHINE WITHOUT A POSITION SENSOR

(71) Applicant: KOSTAL Drives Technology GmbH, Luedenscheid (DE)

(72) Inventors: Peter Landsmann, Munich (DE); Dirk Paulus, Munich (DE); Sascha Kuehl, Munich (DE)

(73) Assignee: KOSTAL DRIVES TECHNOLOGY GMBH, Luedenscheid (DE)

( * ) Notice: Subject to any disclaimer, the term of this patent is extended or adjusted under 35 U.S.C. 154(b) by 175 days.

(21) Appl. No.: 17/225,744

(22) Filed: Apr. 8, 2021

(65) Prior Publication Data

US 2021/0226568 A1 Jul. 22, 2021

Related U.S. Application Data

(63) Continuation of application No. PCT/EP2019/078879, filed on Oct. 23, 2019.

(30) Foreign Application Priority Data

Oct. 24, 2018 (DE) .................. 10 2018 008 384.6
Nov. 5, 2018 (DE) .................. 10 2018 008 689.6

(51) Int. Cl.
*H02P 21/22* (2016.01)
*H02P 21/14* (2016.01)

(52) U.S. Cl.
CPC ............. *H02P 21/22* (2016.02); *H02P 21/14* (2013.01)

(58) Field of Classification Search
CPC .......... H02P 21/22; H02P 21/14; H02P 6/185; H02P 6/186; H02P 2203/11
See application file for complete search history.

(56) References Cited

U.S. PATENT DOCUMENTS

| 5,796,235 A | 8/1998 | Schrodl et al. |
| 5,969,496 A | 10/1999 | Yamada et al. |
| (Continued) | | |

FOREIGN PATENT DOCUMENTS

| DE | 19836237 C1 | 3/2000 |
| DE | 102015217986 A1 | 3/2017 |
| (Continued) | | |

OTHER PUBLICATIONS

Lei Chen, "Impact of Bridge-Saturation on Anisotropy Based Initial Rotor Polarity Detection of Interior Permanent-Magnet Synchronous Machines", 2016, IEEE (Year: 2016).*

(Continued)

*Primary Examiner* — Bickey Dhakal
(74) *Attorney, Agent, or Firm* — Brooks Kushman PC

(57) ABSTRACT

A method and a device provide load-free determination of load-dependent position assignment parameters of a synchronous machine without using a position sensor. The synchronous machine is controlled via clocked (pulsed) terminal voltages from which, in conjunction with the measured electric current response, the inductance or admittance is calculated or wherein the load-free lowest and the load-free highest differential inductance are known. Based on the load-free lowest and the load-free highest differential inductance and the short-circuit electric current, the magnetic saturation behavior of the absolute inductance and/or of the magnetic anisotropy of the synchronous machine under load is predicted and used in the position sensor-free control (Continued)

operation (i.e., closed-loop control mode without a position sensor) for position assignment.

16 Claims, 13 Drawing Sheets

(56) References Cited

U.S. PATENT DOCUMENTS

| | | | |
|---|---|---|---|
| 6,801,011 | B2 | 10/2004 | Ide |
| 8,217,605 | B2 | 7/2012 | Balazovic et al. |
| 8,228,013 | B2 | 7/2012 | Liu et al. |
| 8,373,379 | B2 | 2/2013 | Gao et al. |
| 10,784,805 | B1 * | 9/2020 | Bojoi .................. H02P 21/22 |
| 2008/0129243 | A1 * | 6/2008 | Nashiki ................ H02K 3/28 318/701 |
| 2012/0038298 | A1 | 2/2012 | Villwock et al. |
| 2012/0123715 | A1 * | 5/2012 | Eskola ................ G01R 31/34 702/65 |
| 2018/0131305 | A1 | 5/2018 | Wang |

FOREIGN PATENT DOCUMENTS

| | | |
|---|---|---|
| DE | 102018006657 A1 | 2/2020 |
| EP | 2290806 A2 | 3/2011 |
| EP | 2421147 A1 | 2/2012 |
| WO | 9219038 A1 | 10/1991 |

OTHER PUBLICATIONS

Johannes Graus, "A New Method for the Estimation of the Influence of Stator Saturation on the Differential Inductances ", 2013,952-959 (Year: 2013).*

Chen, Lei et al. "Impact of bridge-saturation on anisotropy-based initial rotor polarity detection of interior permanent-magnet synchronous machines, "2016 19th International Conference on Electrical Machines and Systems (ICEMS), The Institute of Electrical Engineers of Japan, Nov. 13, 2016, pp. 1-6.

The International Bureau of WIPO, International Preliminary Report on Patentability for International Application No. PCT/EP2019/078879, dated Apr. 27, 2021.

European Patent Office, International Search Report for corresponding International Application No. PCT/EP2019/078879, dated Jan. 31, 2020.

* cited by examiner

METHOD AND DEVICE FOR LOAD-FREE DETERMINING OF LOAD-DEPENDENT POSITIONING PARAMETERS OF A SYNCHRONOUS MACHINE WITHOUT A POSITION SENSOR

CROSS-REFERENCE TO RELATED APPLICATIONS

This application is a continuation of International Application No. PCT/EP2019/078879, published in German, with an International filing date of Oct. 23, 2019, which claims priority to DE 10 2018 008 384.6, filed Oct. 24, 2018, and DE 10 2018 008 689.6, filed Nov. 5, 2018, the disclosures of which are hereby incorporated in their entirety by reference herein.

TECHNICAL FIELD

The present invention relates to a method and device for controlling and monitoring a synchronous machine without a position sensor or encoder.

BACKGROUND

Methods that allow efficient control of a synchronous machine without a position sensor or encoder ("sensor") (often referred to as "sensor-less" or "encoder-less" control) are divided into two classes:

1. Fundamental wave methods (bibliography references [1], [2], and [3]) evaluate the voltage induced by movement. At average and high rotational speeds, they provide very good signal properties, but they fail in the lower rotational speed range, in particular when the machine is at a standstill. For operation under load (saturation), fundamental wave methods require an electric current-dependent parameterization of the inductance (bibliography references [4] and [5]).

2. Anisotropy-based methods (bibliography references [6], [7], and [8]) evaluate the position dependency of the inductance of the machine, for which reason no rotational speed is necessary. However, they have numerous problems and difficulties, which explains why many applications thus still use a position sensor (with its drawbacks). For operation under load (saturation), anisotropy-based methods require an electric current-dependent parameterization of the anisotropic shift (bibliography references [9], [10], [11], and [12]).

Sensor-less control of synchronous machines over the entire rotational speed range is implemented via a combination of methods of both classes (bibliography references [8] and [13]).

Magnetic simulation data may be used to determine the electric current-dependent pattern of the inductance and anisotropic shift (bibliography references [14] and [15]). These data differ from reality and require access to the machine design. Alternatively, these patterns may be measured on a test stand structure having a load machine and position sensor (bibliography references [16] and [17]). However, in practice this may be difficult or even impossible when an unknown synchronous machine is to be connected in the field.

For the connection of an unknown synchronous machine, there are approaches for initial parameter identification while disregarding the electric current dependency (bibliography references [18] and [19]). During operation under increased load, these approaches become inaccurate or unstable. Other approaches additionally identify the load dependency by means of short-term macroscopic excitation (bibliography references [20], [21], and [22]). However, these are unavoidably accompanied by torque peaks, which are not acceptable in every application, and which with an unblocked rotor also distort the results of the identification.

Alternatively, the change in the inductance (when there is a change in electric current) may be tracked by online identification methods (bibliography references [23], [24], [25], and [26]), which, however, as a matter of principle have a time delay (slower than the actual change by a factor of 10-1000) and therefore are accurate/stable only in the stationary state.

Approaches for identification during operation likewise exist for the anisotropic shift (bibliography references [27] and [28]), but they require a correctly (non-linearly) parameterized fundamental wave model, and provide satisfactory results only when operating points are passed through in a certain rotational speed range, using many different torque values over a sufficient time period, which cannot be assumed in all applications.

SUMMARY

A method for load-free determination of load-dependent position assignment parameters of a synchronous machine without using a position sensor is provided. The synchronous machine has a stator and a rotor with or without permanent magnets. The method includes actuating the synchronous machine via clocked terminal voltages and measuring electric current of the synchronous machine responsive to the synchronous machine being actuated via the clocked terminal voltages. The method further includes determining an inductance or admittance from each pair of clocked terminal voltage and measured electric current response and determining a load-free lowest and a load-free highest differential inductance from the clocked terminal voltages and the measured electric current responses. The method further includes predicting a magnetic saturation behavior of an absolute inductance and/or of a magnetic anisotropy of the synchronous machine under load on the load-free lowest and the load-free highest differential inductance and a short-circuit electric current and using the predicted magnetic saturation behavior of the absolute inductance and/or of the magnetic anisotropy of the synchronous machine under load in a position sensor-free control operation for position assignment.

BRIEF DESCRIPTION OF THE DRAWINGS

The following is a general discussion which also pertains to optional embodiments of the present invention. In the Figures:

FIG. 8a shows the operation without a saturation assumption, FIG. 8b shows the operation with an assumption of anisotropic shift, and FIG. 8c shows the operation with an assumption of the unambiguous rotor position assignment (RPA).

DETAILED DESCRIPTION

Figure 1:
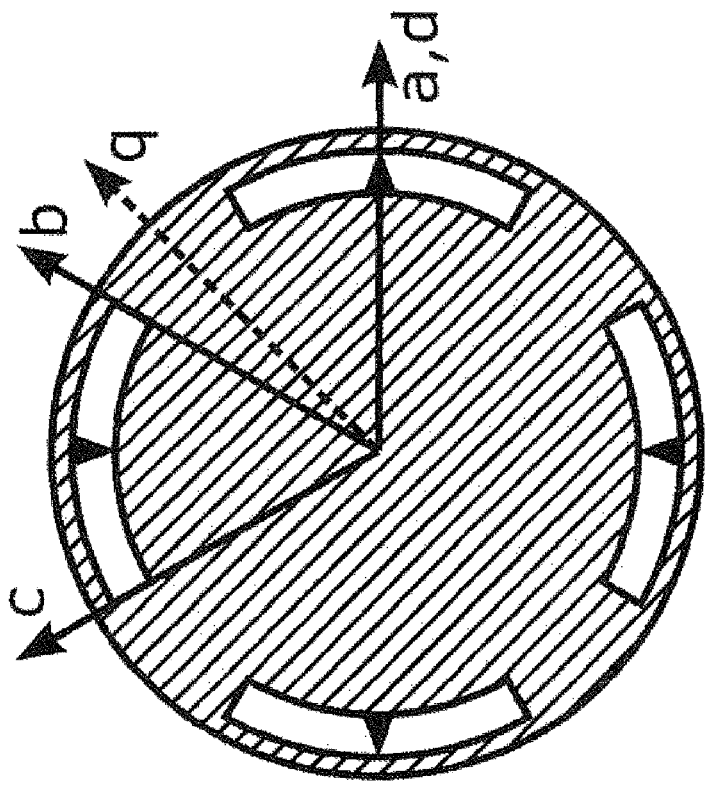
FIG. 1 shows rotor cross sections with surface-mounted (left-side drawing) and buried (right-side drawing) permanent magnets, with soft magnetic material indicated by crosshatch, and the permanent flux direction indicated by triangles.
Figure 1:
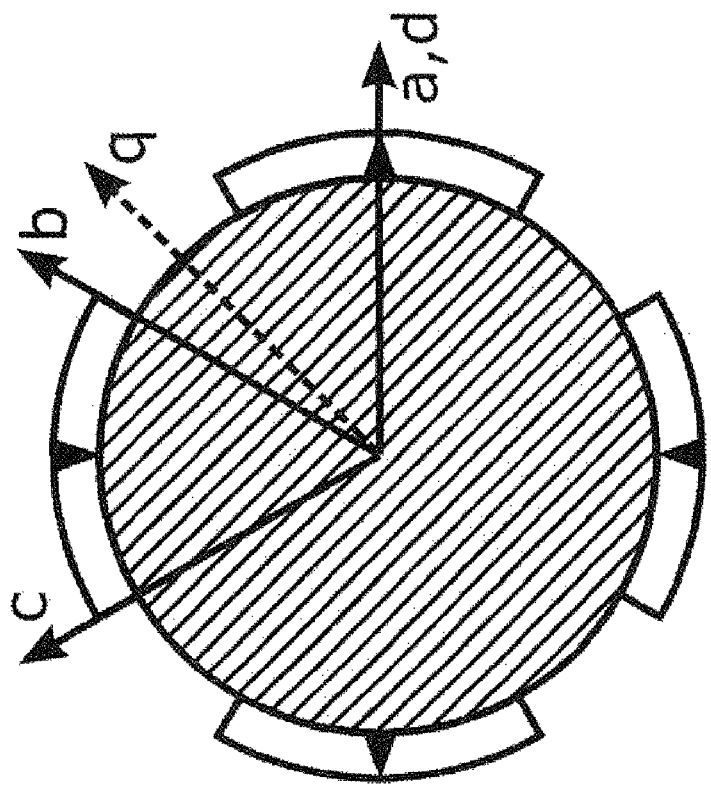

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is pointed out that the Figures show arrangements of machines or patterns of physical variables/qualities only by way of example, and that the method and device described herein, or their embodiments, is/are not limited to the illustrations in the Figures.

The term "machine" is used herein in the sense of an "electric machine," i.e., an electric motor or an electrical generator.

Fundamental wave methods use the general voltage equation of the machine:

$$u_s^s = R_s i_s^s + \frac{d\psi_s^s}{dt} \tag{1}$$

$$\psi_s^s = T(\theta_r)\psi_s^r(i_s^r) \tag{2}$$

$$= \begin{bmatrix} \cos\theta_r & -\sin\theta_r \\ \sin\theta_r & \cos\theta_r \end{bmatrix} \begin{bmatrix} L_d(i_d, i_q)i_d + \psi_{pm} \\ L_q(i_d, i_q)i_q \end{bmatrix}. \tag{3}$$

From the general voltage equation of the machine, with knowledge of the parameters resistance $R_s$ and absolute q-inductance $L_q$, the rotor position $\theta_r$ may be calculated from the time patterns of electric current and voltage at average and high rotational speeds, for example using the following calculation rule:

$$\theta_r = \angle(\int(u_s^s - R_s i_s^s)dt - L_q i_s^s). \tag{4}$$

The so-called absolute inductances $L_d$ and $L_q$ are defined as the quotient of the flux linkage ("flux" for short) and the electric current, and are characterized in that they have only one axis reference (q, for example) in the subscript:

$$L_d = \frac{\psi_d - \psi_{pm}}{i_d} \tag{5}$$

$$L_q = \frac{\psi_q}{i_q}. \tag{6}$$

Anisotropy-based methods use the high-frequency relationship:

$$u_{hf}^s = T(\theta_r)\begin{bmatrix} L_{dd} & L_{dq} \\ L_{dq} & L_{qq} \end{bmatrix} T(-\theta_r)\frac{\Delta i_{hf}^s}{\Delta t} \tag{7}$$

$$= T(\theta_a)\begin{bmatrix} L_\Sigma - L_\Delta & 0 \\ 0 & L_\Sigma + L_\Delta \end{bmatrix} T(-\theta_a)\frac{\Delta i_{hf}^s}{\Delta t} \tag{8}$$

From the high-frequency relationship, the anisotropic angle $\theta_a$ may be calculated (bibliography references [29], [30], and [31]), for example, without knowledge of the parameters. With knowledge of the load-dependent anisotropic shift $\theta_{ar}((i_s^r))$, during operation an estimated value $\hat{\theta}_a$ of the rotor position may be associated with the measured anisotropic angle $\hat{\theta}_r$:

$$\hat{\theta}_r = \hat{\theta}_a - \theta_{ar}(i_s^r). \tag{9}$$

The so-called differential inductances $L_{dd}$, $L_{dq}$, and $L_{qq}$ are defined as the derivative of the flux as a function of the electric current, and have two axis references in the subscript:

$$L_{dd} = \frac{d\psi_d}{di_d} \tag{10}$$

$$L_{qq} = \frac{d\psi_q}{di_q} \tag{11}$$

$$L_{dq} = \frac{d\psi_d}{di_q}. \tag{12}$$

The flux is generally nonlinear with respect to the electric current, for which reason the values $L_{dd}$, $L_{dq}$, and $L_{qq}$ are electric current dependent. The particular value of an electric current-dependent variable at zero electric current (so-called value in the unenergized state) is denoted by the additional variable index zero ("0")—in the case of the differential inductances, $L_{dd0}$ and $L_{qq0}$, for example.

However, anisotropic methods frequently operate with voltage injection and evaluate the electric current response, for which reason the inverse differential inductance, often referred to as admittance Y for simplification, is relevant:

$$\frac{\Delta i_{hf}^s}{\Delta t} = T(\theta_r)\begin{bmatrix} y_{dd} & y_{dq} \\ y_{dq} & y_{qq} \end{bmatrix} T(-\theta_r)u_{hf}^s \tag{13}$$

-continued $$= T(\theta_a)\begin{bmatrix} Y_\Sigma - Y_\Delta & 0 \\ 0 & Y_\Sigma + Y_\Delta \end{bmatrix} T(-\theta_a) u_{hf}^s \quad (14)$$

$$y_{dd} = \frac{di_d}{d\psi_d} \quad (15)$$

$$Y_{qq} = \frac{di_q}{d\psi_q} \quad (16)$$

$$Y_{dq} = \frac{di_d}{d\psi_q} \quad (17)$$

In the above expressions, the so-called anisotropy absolute value Y is one-half the difference between the directionally dependent highest and lowest admittance:

$$Y_\Delta = \sqrt{\left(\frac{Y_{dd} - Y_{qq}}{2}\right)^2 + Y_{dq}^2} \quad (18)$$

The anisotropy absolute value $Y_\Delta$ indicates the strength of the directional dependency of the HF current response.

The term "directional dependency" ("anisotropy" from Greek) means a dependency on the direction of the consideration of the electric current-voltage relationship (not the rotor position) over which various differential inductance values are active ($L_{dd}$ or $Y_{dd}$ acts in the d-direction, $L_{qq}$ or $Y_{qq}$ acts in the q-direction, etc.).

In the unenergized state, the coupling component $Y_{dq}$ is approximately zero, so that equation (18) simplifies to:

$$Y_{\Delta 0} = \frac{Y_{dd0} - Y_{qq0}}{2}. \quad (19)$$

The anisotropic angle $\theta_a$ is the direction of the lowest differential inductance, and consequently, of the highest admittance. The direction of the highest differential inductance, and consequently, of the lowest admittance, is (electrically) shifted by $\pm 90°$. The anisotropic angle may therefore be equivalently calculated from two variables, for example as follows:

$$\theta_a = \frac{1}{2} a\tan 2(Y_{\alpha\beta} + Y_{\beta\alpha},\ Y_{\alpha\alpha} - Y_{\beta\beta}) \quad (20)$$

$$= \frac{1}{2} a\tan 2(L_{\alpha\beta} + L_{\beta\alpha},\ L_{\beta\beta} - L_{\alpha\alpha}). \quad (21)$$

In addition, within the scope of the embodiments described here, with regard to the rotor topology of synchronous machines a distinction is made between two classes:

1. Geometrically isotropic synchronous machines have a rotor cross section in which the quantity and shape of the soft magnetic material do not differ between the various magnetic paths of the phase windings, so that their magnetic anisotropy is due solely to the fact that the exciting element (a permanent magnet or excitation winding, for example) locally saturates the soft magnetic material, i.e., in a directionally dependent manner. The magnetic anisotropy of these machines in the unenergized state is usually lower, namely, $$\frac{|L_{dd0} - L_{qq0}|}{L_{dd0} + L_{qq0}} < 20\%.$$

2. Geometrically anisotropic synchronous machines have a rotor cross section in which the quantity and shape of the soft magnetic material differ between the various magnetic paths of the phase windings, which generates an additional anisotropic component. The magnetic anisotropy of these machines in the unenergized state is therefore usually higher, namely, $$\frac{|L_{dd0} - L_{qq0}|}{L_{dd0} + L_{qq0}} > 20\%.$$

The left-hand portion of FIG. 1 shows a typical example of a geometrically isotropic machine, and the right-hand portion of FIG. 1 shows a typical example of a geometrically anisotropic machine. Only the crosshatched areas have high magnetic conductivity, and due to the geometry of the right cross section, result in a greatly increased inductance here in the q-direction.

Regardless of the actual geometry, it is possible to assign most machines to their corresponding class based on the terminal (clamping) behavior when the initially found anisotropy is compared to the threshold value of 20%.

Saturation Assumptions

A method for the load-free determination of load-dependent position assignment parameters (i.e., load-free determining of load-dependent positioning parameters) of a synchronous machine without a position sensor is presented. The synchronous machine is controlled via clocked terminal voltages. From the clocked terminal voltages, in conjunction with the measured electric current response, the inductance or admittance is calculated. As an alternative to this calculation, the load-free (i.e., unloaded) lowest and the load-free highest differential inductance ($L_{dd0}$ and $L_{qq0}$) can also be known. Based on the load-free lowest and the load-free highest differential inductance ($L_{dd0}$ and $L_{qq0}$) and the short-circuit electric current ($i_{pm}$), the magnetic saturation behavior of the absolute inductance and of the magnetic anisotropy of the synchronous machine under load is predicted and compensated for in the position sensor-free control operation and/or used for position assignment.

In some embodiments, a load-free differential inductance corresponds to the derivative of the flux linkage as a function of the electric current (equations (10), (11), and (12)) in the operating point at zero electric current.

In some embodiments, the lowest and the highest differential inductance are the directionally dependent lowest and highest differential inductance value, respectively, of an operating point, the directional dependency corresponding to the magnetic anisotropy.

If the load-free lowest and the load-free highest differential inductance $L_{dd0}$ and $L_{qq0}$ are not known, then these values may be calculated from the electric current-voltage relationship by electrical excitation of the machines. The excitation may be test pulses, sinusoidal voltage patterns, or a time-discrete voltage injection pattern, for example. Various approaches, which typically set the voltage excitation and the electric current response (for example, electric current amplitude or electric current difference per time interval) into relation with one another are easily found for the calculation. For anisotropic methods using a time-discrete injection pattern (bibliography references [31] and

[32], for example) the anisotropy absolute value $Y_A$ and the isotropic component $Y_\Sigma$ may be internal operands; from their values and the isotropic component $Y_{A0}$ and $Y_{\Sigma 0}$ at zero electric current, the inductances $L_{dd0}$ and $L_{qq0}$ may be calculated as follows, for example:

$$L_{dd0} = \frac{1}{Y_{\Sigma 0} + Y_{A0}} \tag{22}$$

$$L_{qq0} = \frac{1}{Y_{\Sigma 0} - Y_{A0}}. \tag{23}$$

However, any other given rules for calculating a differential inductance may also be used in order to provide the values $L_{dd0}$ and $L_{qq0}$ as the basis for the method described in the present document and/or for the described embodiments.

Even if differential inductances are directly active only for anisotropic methods, in some embodiments they are likewise used for parameterization of fundamental wave methods.

The short-circuit electric current $i_{pm}$ is generally an equivalent electric current value for excitation by the permanent magnet (PM) (or by the excitation winding), which for example
- when applied in the negative d-direction, results in extinction of the flux linkage $\psi_s{}^s=0$, or
- occurs when the shaft is rapidly driven (at nominal rotational speed, for example) when the terminals short-circuit (zero voltage), or
- is determined according to a principle that is physically equivalent to the methods mentioned above, or
- is determined using one of the following calculation rules within the scope of the presented saturation assumption.

However, any other given rules for calculating an equivalent electric current value for excitation by the PM (or by the excitation winding) may also be used to provide the value of the short-circuit electric current $i_{pm}$ for the method and device described in the present document and/or for the described embodiments.

An underlying concept of the saturation assumption and all of its embodiments is that in the unenergized state, the machine is saturated to a certain degree in the d-direction by the PM and is unsaturated in the q-direction, and that in the q-direction the same degree of saturation is present when the short-circuit electric current $i_{pm}$ is applied in the q-direction. Specifically, some embodiments are based on the assumption that the q-axis (direction transverse to the PM) takes on the same magnetic behavior as the d-axis (direction of the PM) in the unenergized state when the short-circuit electric current ($i_q=i_{pm}$) is applied in the q-direction.

Figure 2:
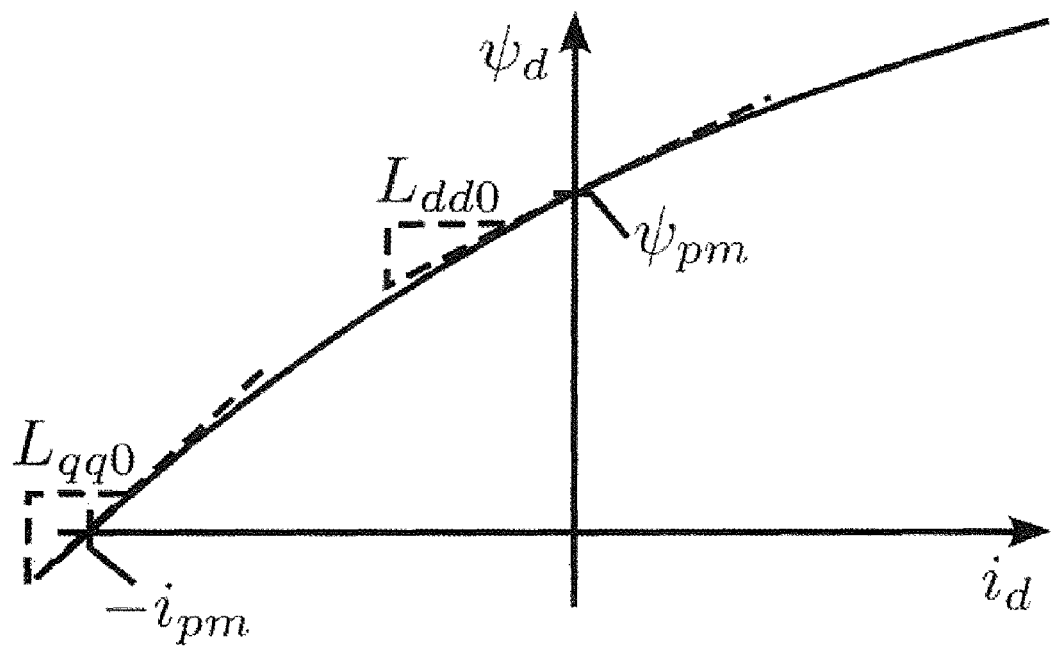
FIG. 2 shows a qualitative illustration of the current-flux relationship in the d-direction, with differential inductances.

FIG. 2 qualitatively shows an example of an electric current-flux relationship in the d-direction, which has a curved shape due to the saturation of the soft magnetic material. Without d-current $i_d=0$, the flux is equal to the PM flux $\psi_d=\psi_{pm}$, and the slope (indicated by the dashed-line tangent with a slope triangle) is equal to the differential d inductance in the unenergized state $L_{dd}=L_{dd0}$. For $i_d=-i_{pm}$ the flux is extinguished ($\omega_d=0$), the iron is therefore unsaturated, and according to the saturation assumption the slope of the flux curve is equal to the differential q-inductance in the unenergized state $L_{dd}=L_{qq0}$.

When an unknown synchronous machine is connected, the PM flux $\psi_{pm}$ may generally be calculated from the nameplate data (for example, 0.471 multiplied by the nominal torque divided by the nominal electric current and the number of pole pairs), or alternatively may be determined by rotating the shaft (for example, based on the ratio of induced voltage to rotational speed).

Based on these data $\psi_{pm}$, $L_{dd0}$, and $L_{qq0}$, within the scope of the saturation assumption the short-circuit electric current $i_{pm}$ may now be calculated as follows. It is apparent in FIG. 2 that for d-currents between $-i_{pm} \leq i_d \leq 0$, all slope values $L_{dd}$ are between $L_{dd0} \leq L_{dd} \leq L_{qq0}$; the exact transition from $L_{qq0}$ to $L_{dd0}$ may vary, depending on the machine.

In some embodiments, the short-circuit electric current ($i_{pm}$) is now calculated as the quotient of the excitation or PM flux linkage ($\psi_{pm}$) and a combination of the load-free lowest and the load-free highest differential inductance ($L_{dd0}$ and $L_{qq0}$). This calculation may take place as follows, for example:

$$i_{pm} = \frac{\psi_{pm}}{k_d L_{dd0} + k_q L_{qq0}}, \tag{24}$$

The influence of the particular inductance may be weighted by use of $k_d$ and $k_q$. In some embodiments, the combination corresponds to an averaged value, for example using the coefficients $k_d=k_q=\frac{1}{2}$. For this purpose, it is assumed, for example, that the average slope is equal to the average of the border slopes $$\overline{L_{dd}} = \frac{L_{dd0} + L_{qq0}}{2},$$

so that $i_{pm}$ may be calculated as follows:

$$i_{pm} = \frac{2\psi_{pm}}{L_{dd0} + L_{qq0}}. \tag{25}$$

Alternatively, the short-circuit electric current $i_{pm}$ may be determined by a short-circuit test, for example. Regardless of its determination, the short-circuit electric current $i_{pm}$ is a key parameter for the subsequent calculations of parameters for fundamental wave methods as described in sub-section 1.1 below and for anisotropic methods as described in sub-sections 1.2 and 1.3 below.

The presented approaches for calculating the parameters for anisotropic methods are preferably applicable to geometrically isotropic machine types. Therefore, in some embodiments a compensation and/or utilization of the position assignment of the anisotropy saturation calculations take(s) place only when the difference between the load-free highest and the load-free lowest differential inductance is less than 20% of their sum.

1.1 Fundamental Wave Inductance

One example of a parameter of fundamental wave methods that is stored as a function of electric current for taking saturation into account is the absolute inductance in the q-direction $L_q$.

In some embodiments, the absolute inductance $L_q$, as a parameter for evaluating the induced voltage, is calculated in such a way that, starting from its value of the load-free highest differential inductance ($L_{qq0}$) that is valid at zero electric current, with increasing electric current it drops so that upon reaching the short-circuit electric current ($i_{pm}$) it is equal to the average value of the load-free lowest and highest differential inductance ($L_{dd0}$ and $L_{qq0}$).

Figure 3:
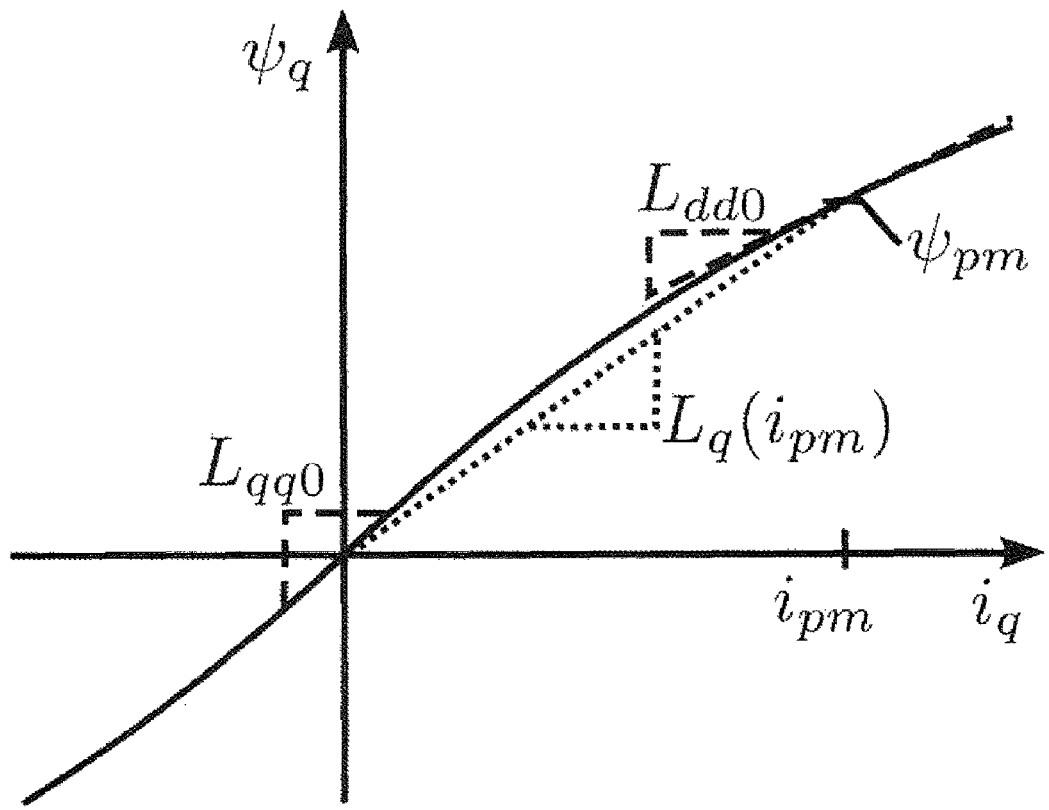
FIG. 3 shows a qualitative illustration of the current-flux relationship in the q-direction, with differential and absolute inductances.

FIG. 3 shows an example of an electric current-flux relationship in the q-direction, which for a geometrically isotropic machine is equal to that in the d-direction, with the difference that the curves are horizontally shifted with respect to one another in such a way that the q-curve extends point-symmetrically through the origin, and the d-curve passes through $-i_{pm}$.

According to the above saturation assumption on which the following exemplary embodiments are based, $\psi_q = \psi_{pm}$ when $i_q = i_{pm}$, in which case the slope is likewise $L_{qq} = L_{dd0}$. However, the absolute inductance $L_q$ has a value different from $L_{qq}$, as illustrated by the dotted lines.

In order to deduce the pattern of the absolute inductance $L_q$ ($i_q$) from the differential inductances $L_{dd0}$ and $L_{qq0}$ (possibly measured based on injection), for example it is initially assumed that the pattern of the differential inductance $L_{qq}$ ($i_q$) is linear and symmetrical ($L_{qq}$ ($i_q$)=$L_{qq}$ ($-i_q$)):

$$L_{qq}(i_q) = L_{qq0} + (L_{dd0} - L_{qq0})\frac{|i_q|}{i_{pm}}. \qquad (26)$$

According to equation (11), $\psi_q$ ($i_q$) results from integration, for example:

$$\psi_q(i_q) = \int_0^{i_q} L_{qq}(i_q) di_q \qquad (27)$$

$$= L_{qq0} i_q + \frac{L_{dd0} - L_{qq0}}{2 i_{pm}} |i_q| i_q \qquad (28)$$

According to equation (6), the pattern $L_q$ ($i_q$) results from division, for example ($\psi_q / i_q$):

$$L_q(i_q) = L_{qq0} + \frac{L_{dd0} - L_{qq0}}{2 i_{pm}} |i_q| \qquad (29)$$

$$= L_{qq0} + m_L |i_q| \qquad (30)$$

$$m_L = \frac{L_{dd0}^2 - L_{qq0}^2}{4\psi_{pm}}, \qquad (31)$$

$m_L$ has been expressed using equation (25).

$$L_q = \frac{L_{dd0} + L_{qq0}}{2}$$

(equation (29)) results for $i_q = i_{pm}$ and is therefore consistent for calculating the short-circuit electric current (equation (25)). $L_q = L_{qq0}$ (equation (29)) results for $i_q = 0$, and thus corresponds to the fact that for zero current the differential inductance and the absolute inductance are equal.

For example, by use of this linear law (equation (29) or equations (30) and (31)), the saturation of the central fundamental wave parameter $L_q$ may be approximated based on the initial measurable and/or calculatable parameters $L_{dd0}$, $L_{qq0}$, and $\psi_m$. This approximation fits well for geometrically isotropic machines. For geometrically anisotropic machines, this approximation does have errors in the conservative range—i.e., the saturation is too weakly compensated for—because the saturation behavior of the soft magnetic material in the q-direction cannot be derived from the d-direction, but it may still be applied.

A compensation according to this approximation is better than no compensation at all. Therefore, the law for the electric current dependency of the fundamental wave inductance (equation (29) or equations (30) and (31)) may be applied to all PM machines, for geometrically isotropic as well as for geometrically anisotropic machines.

1.2 Anisotropic Shift

The anisotropy of geometrically isotropic machines is caused by local saturation of the soft magnetic material, which in the unenergized state is at a maximum in the PM direction. The anisotropy is then aligned with the rotor and revolves essentially with the rotor during rotation. When a torque-forming electric current is applied, a relative shift between the rotor and the anisotropy appears due to the fact that the electric current, oriented transversely with respect to the PM, influences the saturation state.

In some embodiments, a saturation current vector is calculated by vectorial addition of the phase current vector and the short-circuit current vector, the short-circuit current vector having the absolute value of the short-circuit current and being oriented in the direction of the PM.

In the following description of the embodiment by way of example, the saturation current vector is represented by $i_{sat}^s$, the phase current vector by $i_s^s$, and the short-circuit electric current vector by $i_{pm}^s$, in each case expressed in stator coordinates (superscript s). The same vectors represented in rotor coordinates are $i_{sat}^r$, $i_s^r$, and $i_{pm}^r$.

The short-circuit electric current $i_{pm}^r$ and the electric current $i_s^r$ in the stator winding are now superimposed linearly, for example, and the sum results in the saturation electric current $i_{sat}^r$:

$$i_{sat}^r = i_{pm}^r + i_s^r \qquad (32)$$

$$= \begin{bmatrix} i_{pm} + i_d \\ i_q \end{bmatrix} \qquad (33)$$

The direction thereof specifies the saturation maximum and therefore orients the anisotropy. This results in the so-called anisotropic shift $\theta_{ar}$, i.e., the shift of the anisotropic angle relative to the rotor (or the anisotropic angle in rotor coordinates), according to the orientation of the saturation current in rotor coordinates $\angle i_{sat}^r$:

$$\theta_{ar} = \theta_a - \theta_r \qquad (34)$$

$$= a\tan2(i_{satq}, i_{satd}) = \angle i_{sat}^r. \qquad (35)$$

Thus, in some embodiments the anisotropic shift $\theta_{ar}$, as a parameter for evaluating the magnetic anisotropy, is calculated in such a way that with increasing phase current it increases such that the orientation of the anisotropy thus assumed corresponds to the direction of the saturation current vector.

Figure 4:
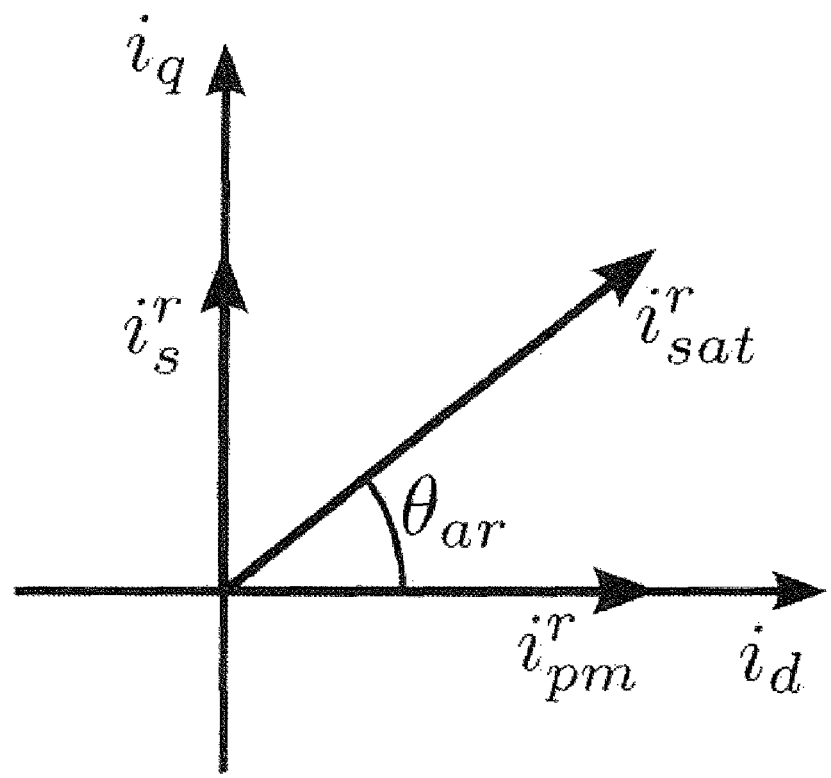
FIG. 4 shows electric current vector summation in rotor coordinates and anisotropic shift for geometrically isotropic machines.

FIG. 4 shows an example of how the short-circuit electric current $i_{pm}^r$ and the stator electric current $i_s^r$ in rotor coordinates are vectorially added, resulting in the saturation electric current $i_{sat}^r$, whose orientation in rotor coordinates is equal to the anisotropic shift $\theta_{ar}$ for geometrically isotropic machines.

This shift angle $\theta_{ar}$, for example during operation under load, is subtracted from the measured anisotropic angle $\hat\theta_a$ (result of the anisotropy identification, for example one of the methods of bibliography references [6], [7], [8], and [31]) to obtain the estimated rotor position:

$$\hat{\theta}_r = \tilde{\theta}_a - \theta_{ar}. \tag{36}$$

Since for geometrically isotropic machines the so-called maximum torque per ampere (MTPA) setpoint current trajectory is situated essentially on the q-axis, in the lower rotational speed range these machines are usually operated without a d-setpoint electric current component. Thus, equation (35) may be simplified to:

$$\theta_{ar} = a\tan 2(i_q, i_{pm}) \tag{37}$$

$$\approx \frac{0,8}{i_{pm}} i_q. \tag{38}$$

In the range $|i_q|<i_{pm}$, for example, the behavior of the latter linear approximation equation (38) tends to be conservative (no overcompensation), with approximation errors of up to less than 3.7°. It is computationally more economical than equation (37), in particular because the factor $k_{ar}=0.8/i_{pm}$ is constant during operation.

1.3 Parameters for Unambiguous (i.e., Clear) Anisotropy Rotor Position Assignment If the anisotropy absolute value $Y_\Delta=|y_\Delta{}^s|$ is additionally included as a function of the saturation electric current $i_{sat}{}^r$, then a rule for unambiguously assigning the rotor position may likewise be derived from the values $L_{dd0}$, $L_{qq0}$, and $i_{pm}$ known at the outset.

In some embodiments, the anisotropy absolute value $Y_\Delta$, as a parameter for unambiguously assigning the anisotropy rotor position, is calculated in such a way that, starting from its value $Y_{\Delta 0}$ effective at zero electric current, it progressively increases over the saturation electric current absolute value:

$$Y_\Delta = f_\Delta(|i_s^r|) \tag{39}$$

$$f_\Delta(i_{pm}) = Y_{\Delta 0} = \frac{1}{2}\left(\frac{1}{L_{dd0}} - \frac{1}{L_{qq0}}\right) \tag{40}$$

Figure 5:
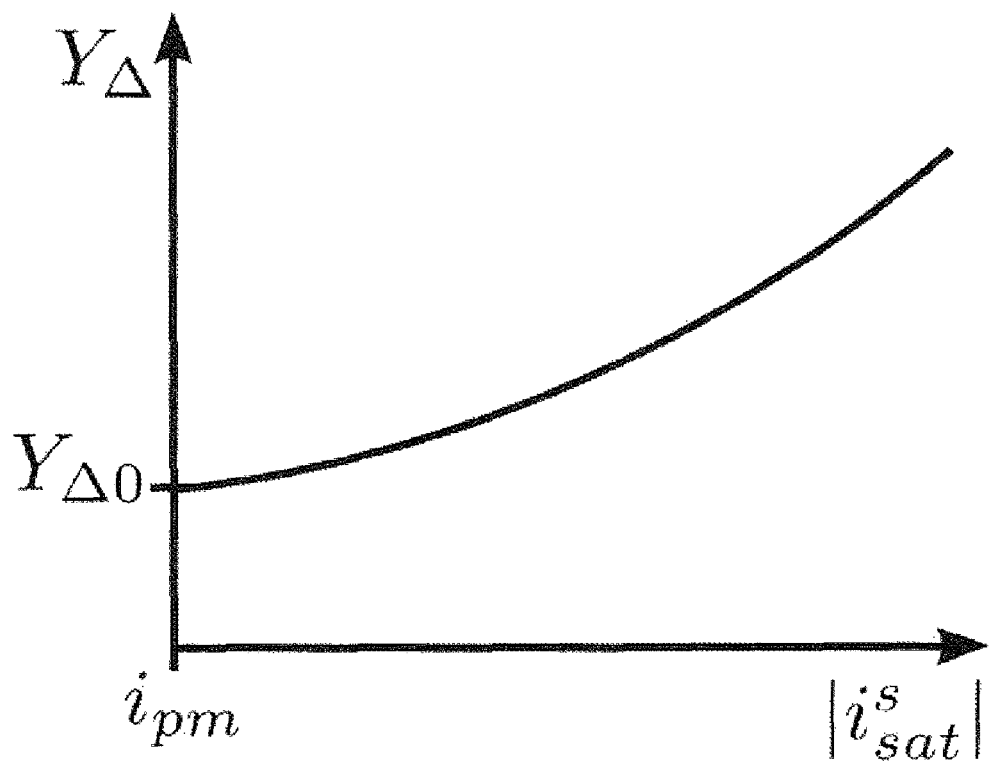
FIG. 5 shows a qualitative pattern of the anisotropy absolute value as a function of the absolute value of the saturation electric current.

This is qualitatively illustrated in FIG. 5.

According to equation (40), in some embodiments the anisotropy absolute value $Y_{\Delta 0}$ that is effective at zero electric current is determined from the load-free differential inductances ($L_{dd0}$ and $L_{qq0}$).

Specifically, a progressive pattern means that the slope of $f_\Delta(x)$ for positive arguments x is always positive, and increases as the argument increases:

$$\frac{df_\Delta(x)}{dx} > 0, \quad \forall x > 0 \tag{41}$$

$$\frac{d^2 f_\Delta(x)}{dx^2} > 0, \quad \forall x > 0. \tag{42}$$

In some embodiments, the progressive increase in the anisotropy absolute value corresponds to an increase that is proportional to the saturation electric current absolute value to the third power. This is represented by the following formula, for example:

$$Y_\Delta = \frac{Y_{\Delta 0}}{i_{pm}^3}|i_{sat}^r|^3 = \frac{Y_{\Delta 0}}{i_{pm}^3}|i_{sat}^s|^3. \tag{43}$$

An example anisotropy vector may be constructed from the anisotropy absolute value and the anisotropy orientation:

$$y_\Delta^s = Y_\Delta \begin{bmatrix} \cos 2\theta_a \\ \sin 2\theta_a \end{bmatrix} \tag{44}$$

All variables $Y_\Delta$ and $\theta_a$ are a function of the saturation electric current vector $i_{sat}{}^r$. However, in contrast to equation (37), for the derivation of the unambiguous rotor position assignment it cannot be assumed that the d current component is zero:

$$\theta_{ar} = a\tan 2(i_q, i_d + i_{pm}) = \angle i_{sat}^r \tag{45}$$

And, for example, it is not the anisotropic shift relative to the rotor $\theta_{ar}$, but, rather, the anisotropic angle in stator coordinates $\theta_a$ that is used, which may be described as a function of the saturation electric current in stator coordinates $i_{sat}{}^s$ as follows:

$$\theta_a = a\tan 2(i_q, i_d + i_{pm}) + \theta_r \tag{46}$$

$$= a\tan 2(i_\beta + i_{pm}\sin\theta_r, i_\alpha + i_{pm}\cos\theta_r) = \angle i_{sat}^s \tag{4}$$

Figure 6:
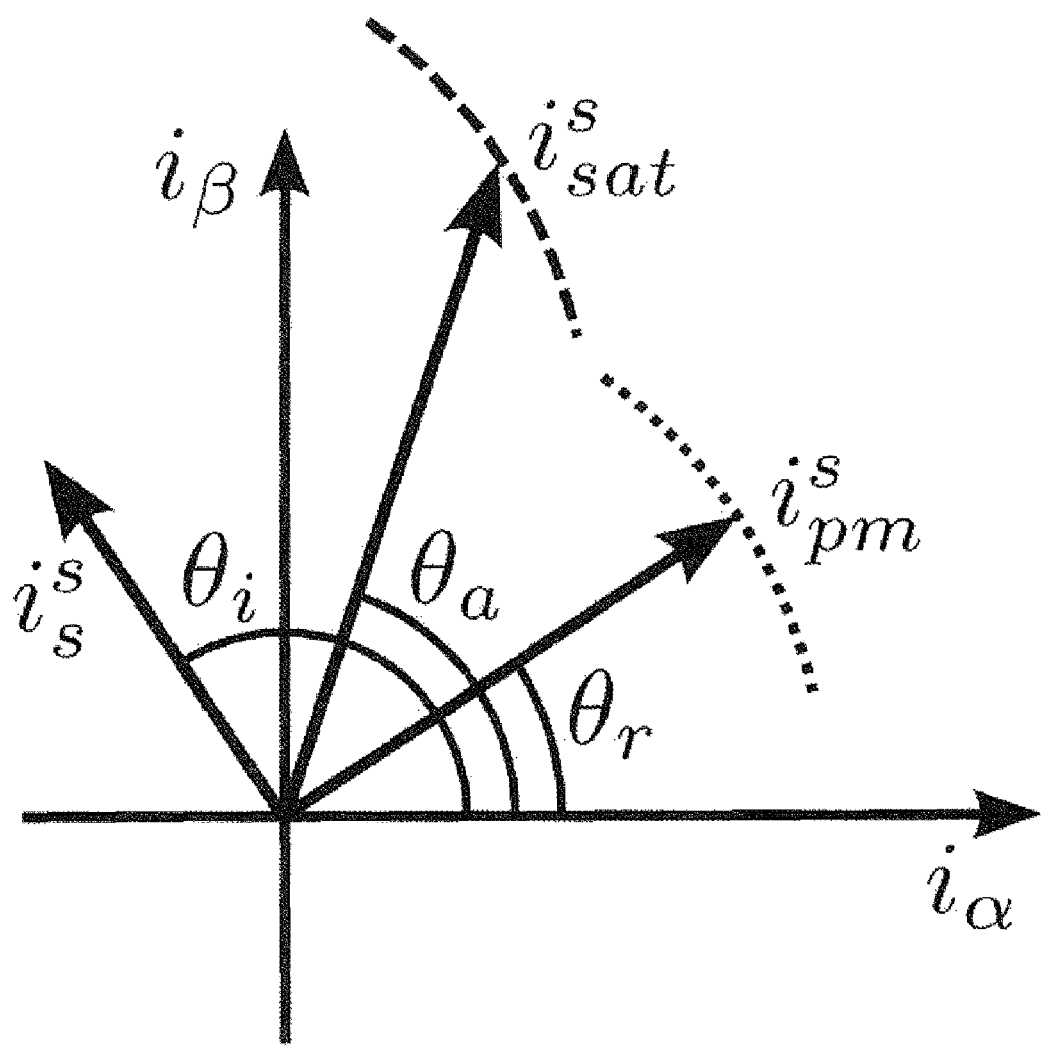
FIG. 6 shows electric current vector summation in stator coordinates, and the resulting dependency of the absolute value and the angle of the saturation electric current on the rotor position.
Figure 7A:
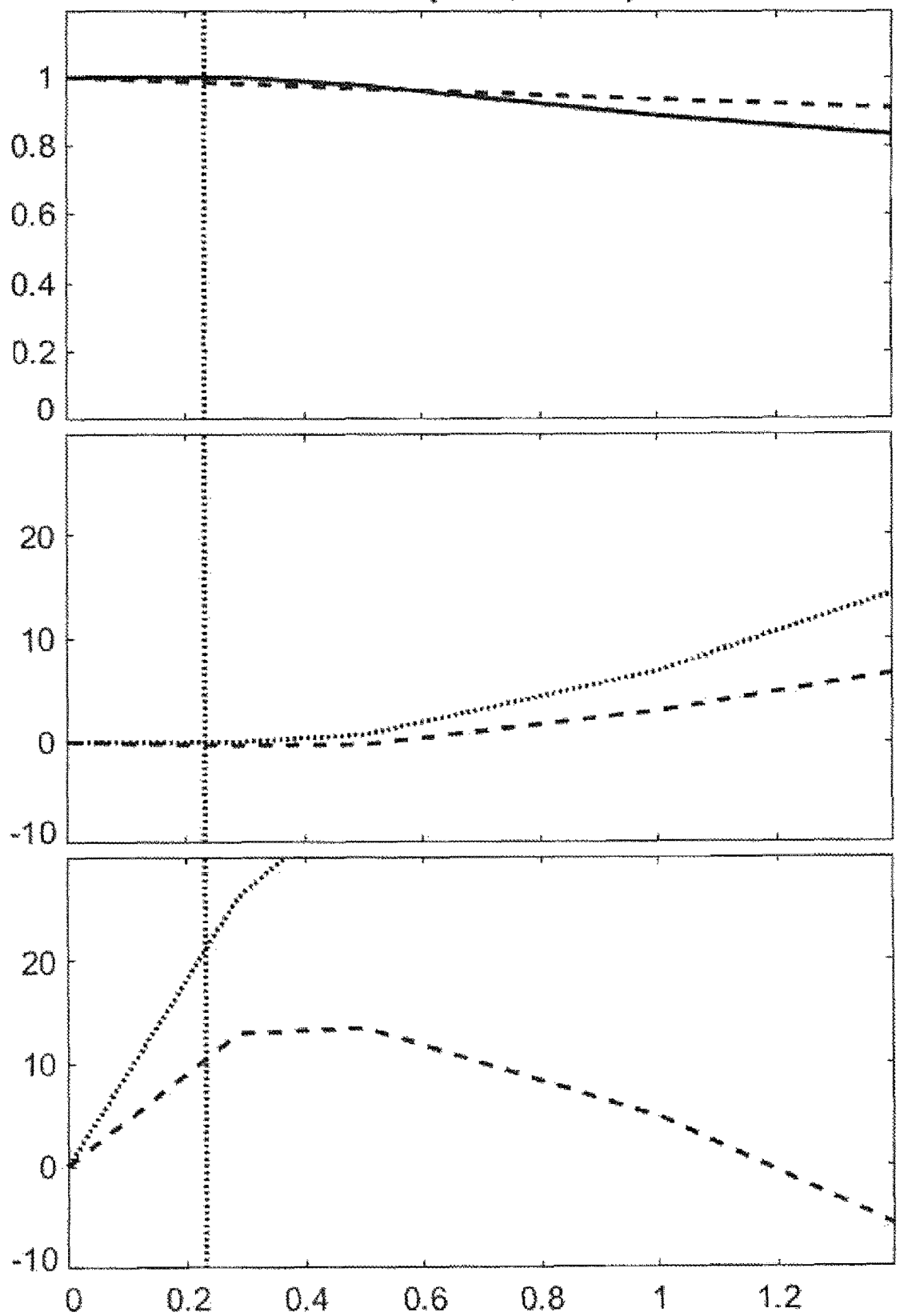
FIGS. 7a, 7b, 7c, 7d, 7e, and 7f show patterns of three geometrically isotropic (SPM) and three geometrically anisotropic (IPM) PM (permanent magnet) synchronous machines calculated from measured data, plotted in each case as a function of the normalized load $i_q/i_{pm}$, in each case at the top: the pattern of the absolute inductance $L_q(i_g)/L_{qq0}$, measured (solid line) and according to the saturation assumption (dashed line); in each case at the vertical center: the pattern of the resulting fundamental wave angular error $\hat{\theta}_r - \theta_r$ in [° el], without (dotted line) and with (dashed line) the saturation assumption, and in each case at the bottom: the pattern of the anisotropy-based estimation error $\hat{\theta}_r - \theta_r$ in electrical degrees, without (dotted line) and with (dashed line) the saturation assumption; the vertical dotted line in each case marks the nameplate nominal electric current.
Figure 7B:
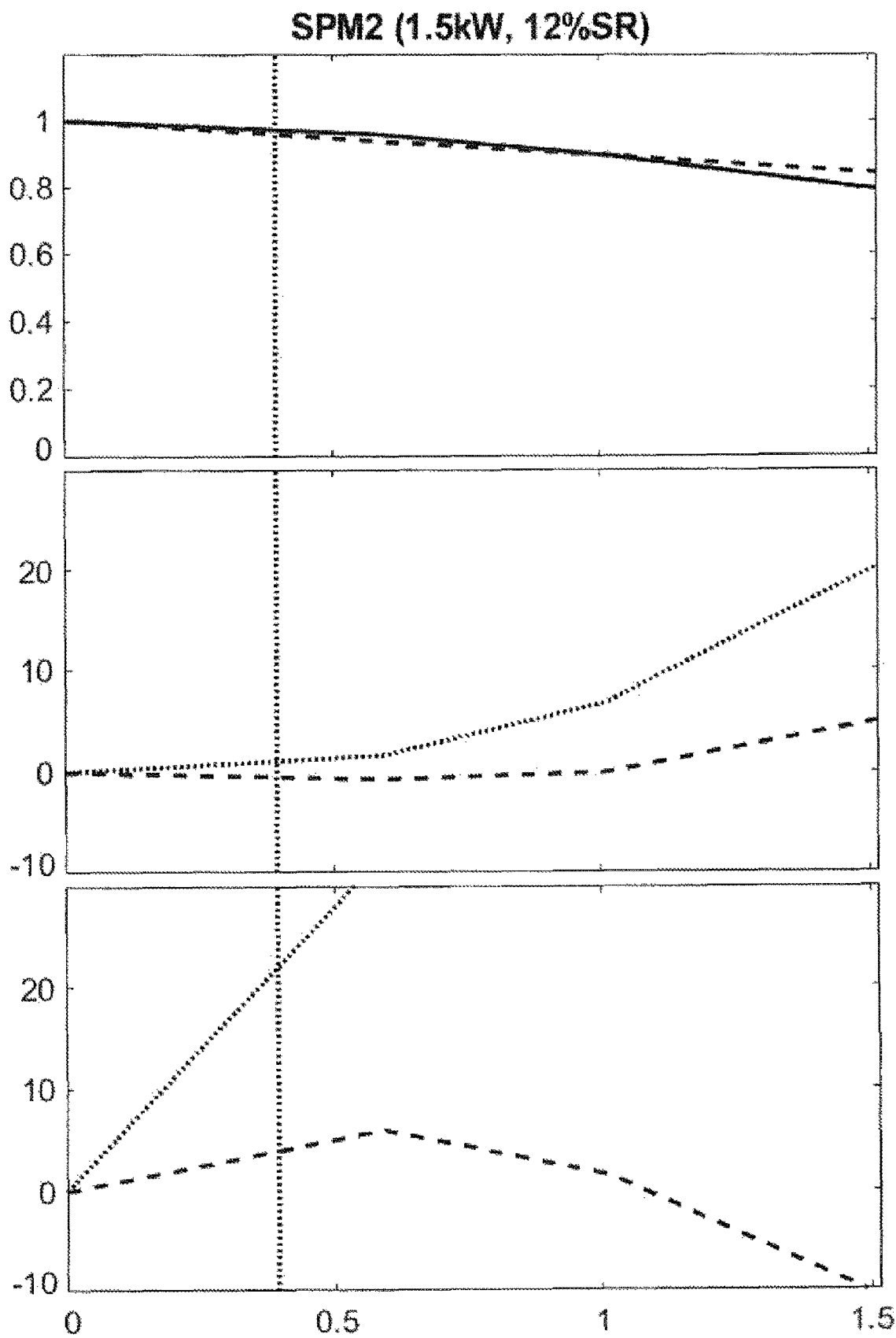
Figure 7C:
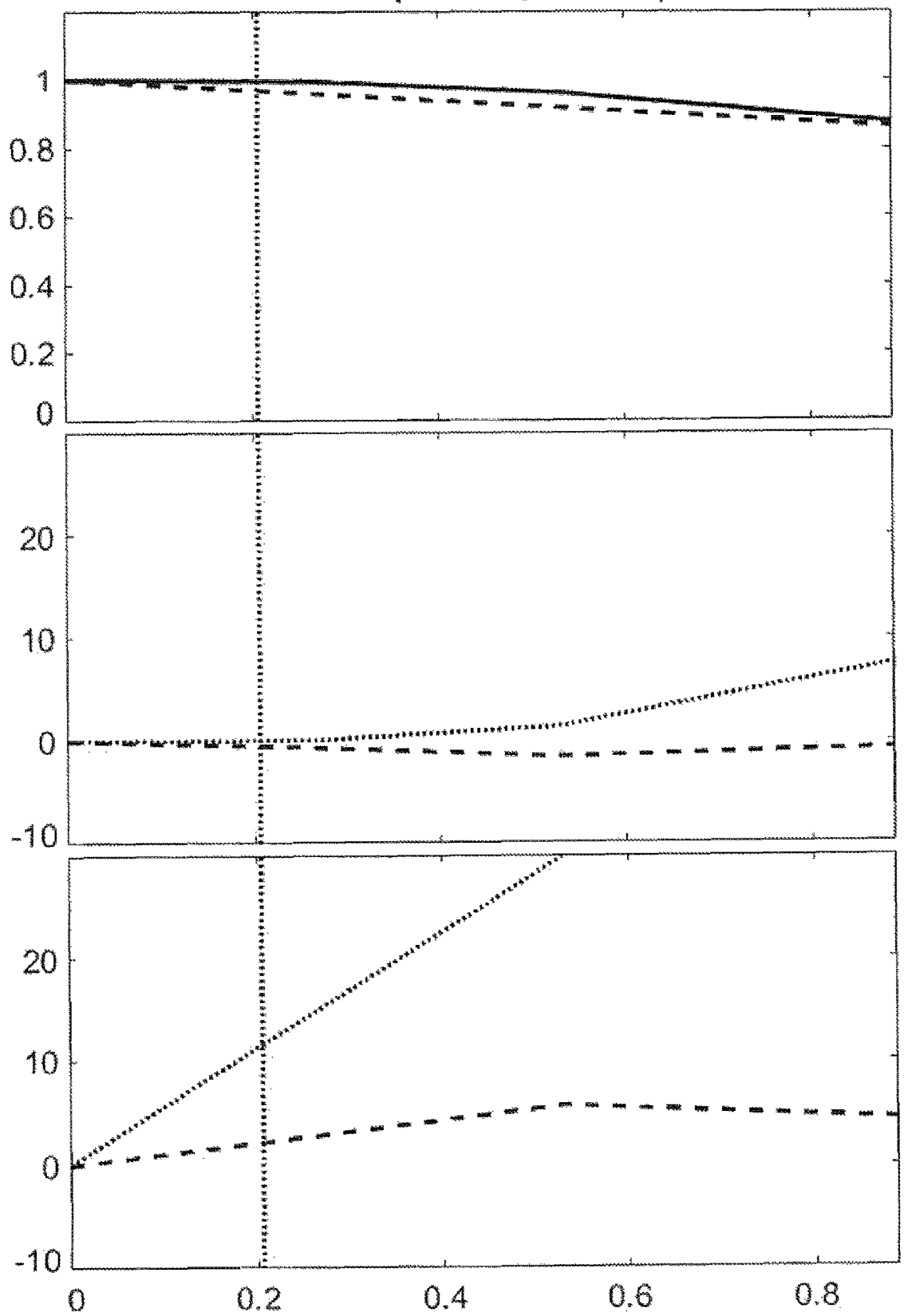
Figure 7D:
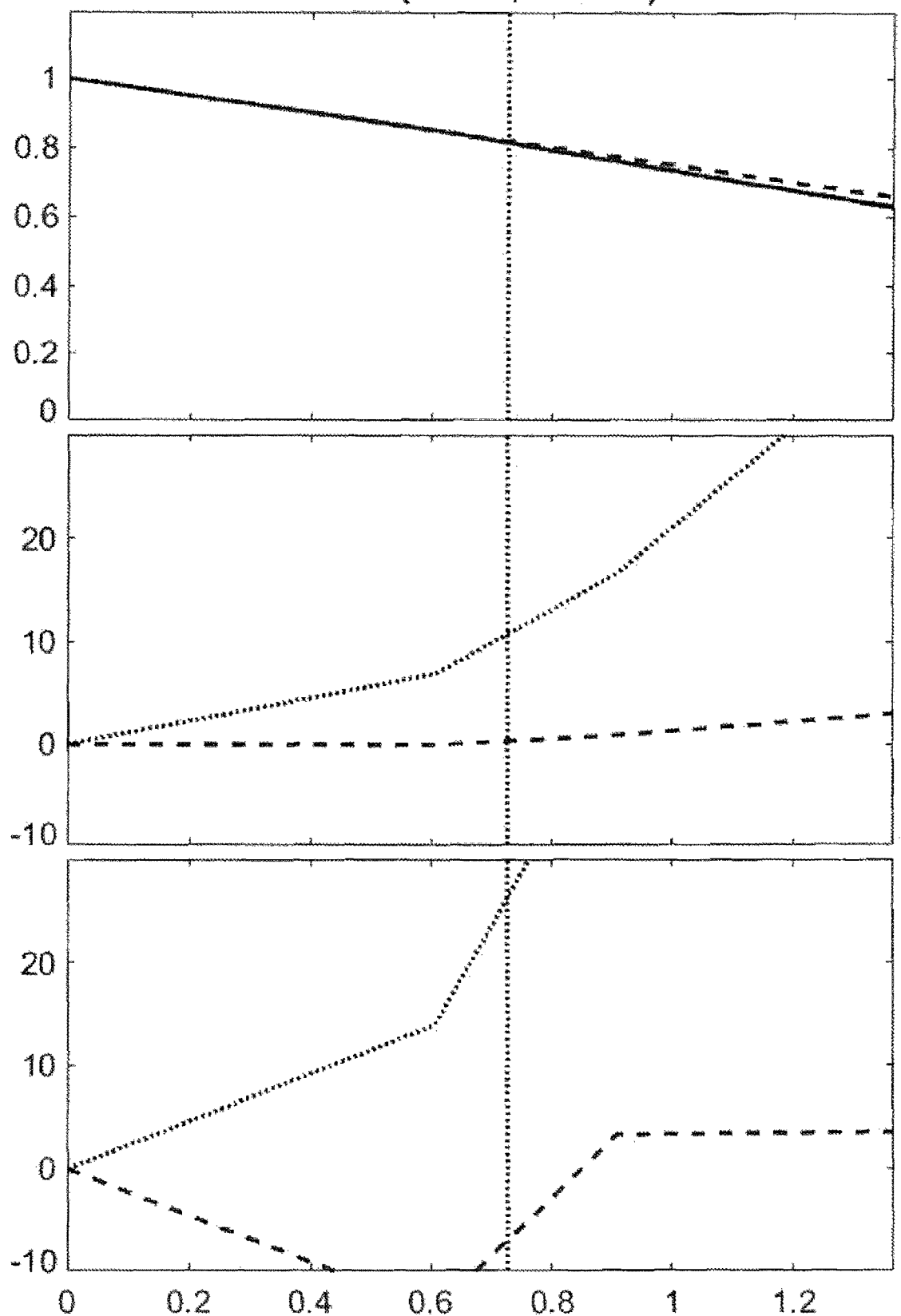
Figure 7E:
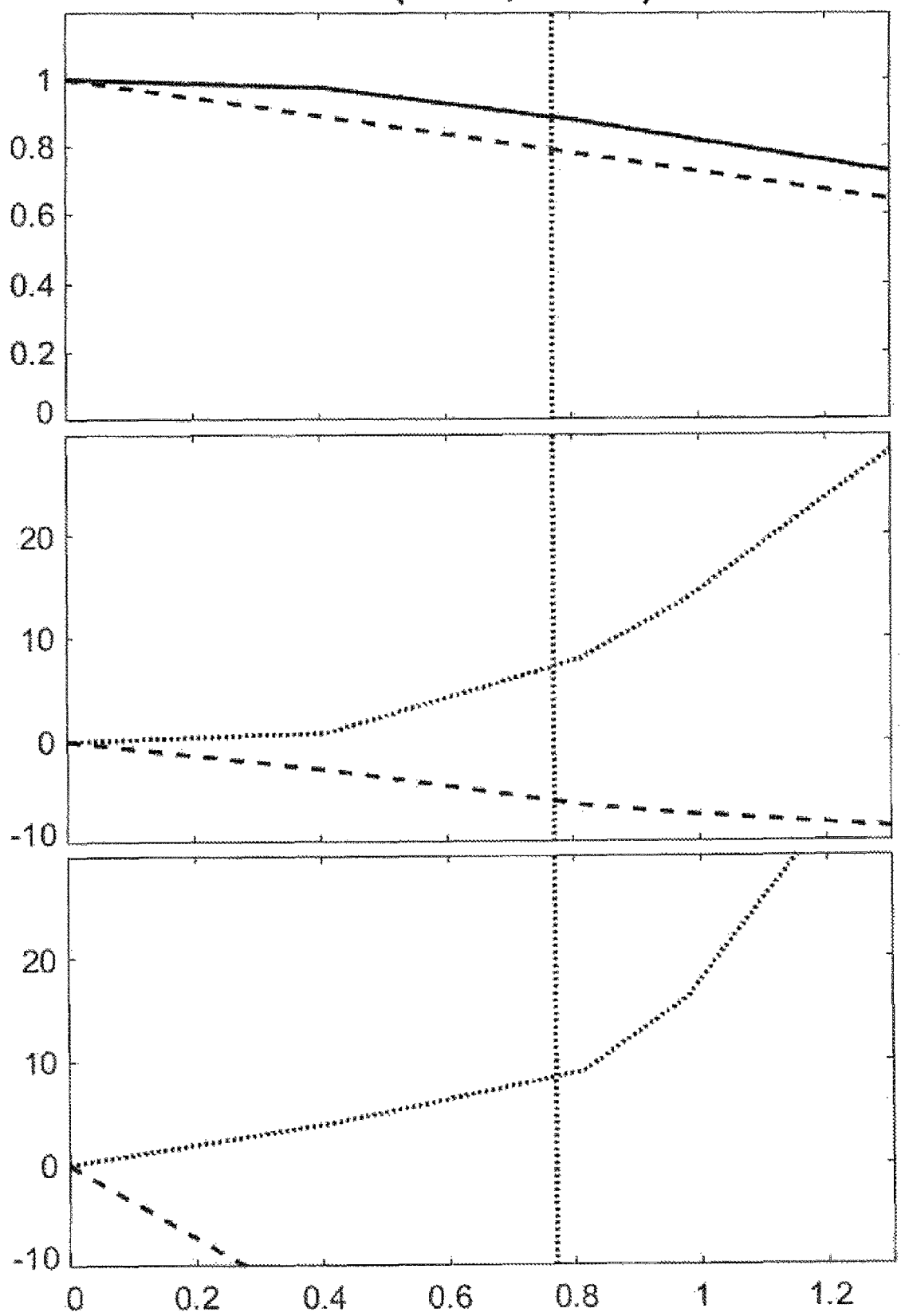
Figure 7F:
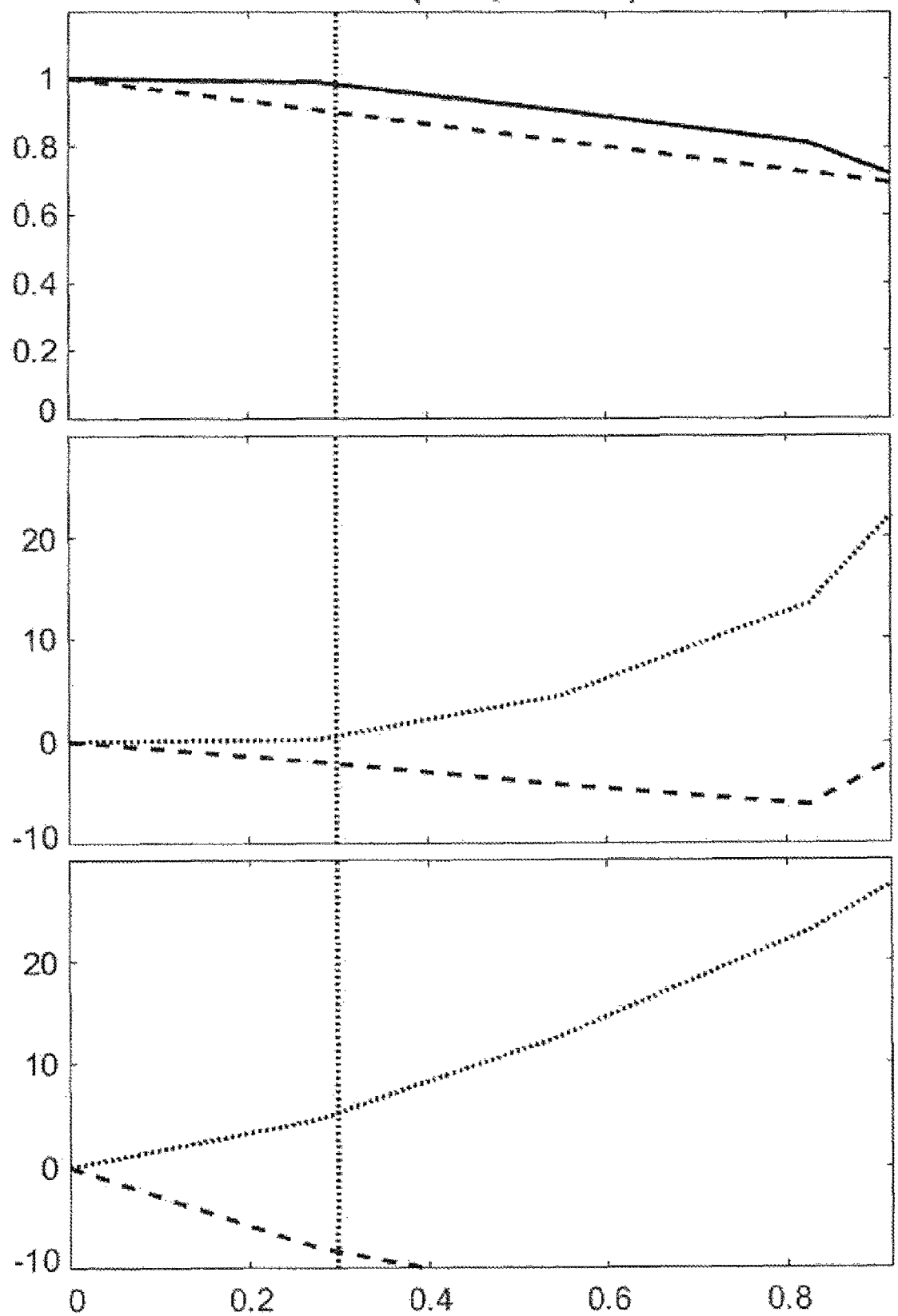

FIG. 6 shows an example of how the short-circuit electric current $i_{pm}{}^s$ and the stator electric current $i_s{}^s$ in stator coordinates are vectorially added in equation (47), resulting in the saturation current $i_{sat}{}^s$ in stator coordinates. When the rotor angle $\theta_r$ is varied at constant stator electric current $i_s{}^s$ (SFC condition), the short-circuit electric current $i_s{}^s$ moves on a concentric circular path (dotted line) and the saturation current consequently moves on a circular path that is shifted by $i_s{}^s$ (dashed line). On this shifted circular path, the absolute value $|i_{sat}{}^s|=|i_{sat}{}^r|$ and also the angle $\angle i_{sat}{}^s$ of the saturation current change over the rotor rotation, as established by equations (43) and (47).

Thus, by use of equations (43) and (47) and $|i_{sat}{}^r|=i_{sat}{}^s$, the anisotropy vector $y_\Delta{}^s$ may now be expressed, for example, as a function of the electric current $i_s{}^s$ in stator coordinates and the rotor position $\theta_r$:

$$y_\Delta^s = \frac{Y_{\Delta 0}}{i_{pm}^3} \begin{bmatrix} \cos\left(2a\tan\frac{i_\beta + i_{pm}\sin\theta_r}{i_\alpha + i_{pm}\cos\theta_r}\right) \\ \sin\left(2a\tan\frac{i_\beta + i_{pm}\sin\theta_r}{i_\alpha + i_{pm}\cos\theta_r}\right) \end{bmatrix} \tag{48}$$

$$\sqrt{(i_\alpha + i_{pm}\cos\theta_r)^2 + (i_\beta + i_{pm}\sin\theta_r)^2}^{\,3} \tag{49}$$

$$= f_s(\theta_r, i_s^s),$$

This, according to bibliography reference [33], is the basis for calculating an unambiguous rotor position assignment rule.

In some embodiments, a modeled anisotropy vector ($y_\Delta{}^s$) is thus constructed which has the length of the anisotropy absolute value ($Y_\Delta$) and an orientation that is twice the anisotropic angle ($2\theta_a$), the anisotropic angle ($\theta_a$) corresponding to the sum of the rotor position ($\theta_r$) and the anisotropic shift ($\theta_{ar}$), so that the modeled anisotropy vector is described as a function of the phase electric current vector ($i_s{}^s$) and the rotor position ($\theta_r$). This modeled anisotropy vector is then represented by $y_\Delta{}^s(\theta_r, i_s{}^s)$, for example.

Two exemplary embodiments are described below which convert equation (49) into an unambiguous position assignment rule (for example, $\hat{\theta}_r = f_s'(y_\Delta{}^s, i_s{}^s)$).

1.3.1 Linear Position Assignment

In some embodiments, the position dependency of the modeled anisotropy vector is linearized for various stator-fixed electric current values in the setpoint electric current working point, and a linear position assignment rule is used which corresponds to a projection of the measured anisotropy vector ($\tilde{y}_\Delta^s$) onto the linearization that is valid for the measured electric current.

For this purpose, the dependency of the function of equation (49) on the rotor position $\theta_r$ is linearized in the setpoint electric current working point under the constraint of an unchanged electric current in stator coordinates $i_s^s$=const. (the so-called SFC trajectory).

As mentioned above, for geometrically isotropic machines the setpoint electric current working point is situated on the q-axis:

$$\angle i_s^s = \theta_r + \frac{\pi}{2}. \tag{50}$$

Linearization may take place around this working point equation (50) by use of the virtual shift h (a small value, for example 1°):

$$y_{\Delta 0}^s(i_s^s) = f_s\left(\angle i_s^s - \frac{\pi}{2},\ i_s^s\right) \tag{51}$$

$$m_\Delta^s(i_s^s) = \frac{f_s\left(\angle i_s^s - \frac{\pi}{2} + \frac{h}{2},\ i_s^s\right) - f_s\left(\angle i_s^s - \frac{\pi}{2} - \frac{h}{2},\ i_s^s\right)}{h}, \tag{52}$$

$m_\Delta^s$ is the slope and $y_{\Delta 0}^s$ is the offset of the straight line, which equation (49) describes in and close to the working point:

$$y_{\Delta L}^s(\theta_r) = m_\Delta^s(i_s^s)\theta_r + y_{\Delta 0}^s(i_s^s). \tag{53}$$

A linear position assignment rule by way of example may now be derived from these linearized parameters $m_\Delta^s$ and $y_{\Delta 0}^s$:

$$\hat{\theta}_r = \frac{m_\Delta^{sT}(\tilde{y}_\Delta^s - y_{\Delta 0}^s)}{m_\Delta^{sT} m_\Delta^s}, \tag{54}$$

This corresponds to a projection of the measured anisotropy vector $\tilde{y}_\Delta^s = [\tilde{Y}_{\Delta\alpha}\ \tilde{Y}_{\Delta\beta}]^T$ onto the straight line $y_{\Delta L}^s(\theta_r)$, with assumption of the associated angular value.

Since within the scope of this example of saturation assumption, no information concerning anisotropy harmonics is present, $m_\Delta^s$ and $y_{\Delta 0}^s$ already contain all available information for a current absolute value $|i_s^s|$. For this purpose, an evaluation in double current coordinates may take place according to bibliography reference [33]:

$$\gamma_\Delta^{ii} = \begin{bmatrix} Y_{\Delta x} \\ Y_{\Delta y} \end{bmatrix} \tag{55}$$

$$= \begin{bmatrix} \cos(2\theta_i) & \sin(2\theta_i) \\ -\sin(2\theta_i) & \cos(2\theta_i) \end{bmatrix} y_\Delta^s \tag{56}$$

$$\theta_i = a\tan 2(i_\alpha,\ i_\beta) = \angle i_s^s \tag{57}$$

Within the scope of this saturation assumption, for example, this may be calculated in a simplified manner by evaluating $f_s(\cdot)$ from equation (49) for electric current angle $\theta_i = 0$, i.e., $i_\beta = 0$ and $$\theta_r \approx -\frac{\pi}{2}: \tag{58}$$

$$y_{\Delta 0}^{ii}(i_q) = f_s\left(-\frac{\pi}{2},\ \begin{bmatrix} i_q \\ 0 \end{bmatrix}\right)$$

$$m_\Delta^{ii}(i_q) = \frac{f_s\left(-\frac{\pi}{2} + \frac{h}{2},\ \begin{bmatrix} i_q \\ 0 \end{bmatrix}\right) - f_s\left(-\frac{\pi}{2} - \frac{h}{2},\ \begin{bmatrix} i_q \\ 0 \end{bmatrix}\right)}{h}. \tag{59}$$

A linear position assignment rule by way of example may now be derived from equations (51) and (52) or equations (58) and (59):

$$k_x = \frac{m_x}{m_x^2 + m_y^2} \tag{60}$$

$$k_x = \frac{m_y}{m_x^2 + m_y^2} \tag{61}$$

$$k_0 = -\frac{m_x Y_{0x} + m_y Y_{0y}}{m_x^2 + m_y^2} - \theta_i \tag{62}$$

$$\hat{\theta}_r = k_x \tilde{Y}_{\Delta x} + k_y \tilde{Y}_{\Delta y} + k_0 + \theta_i, \tag{63}$$

Equations (60), (61), and (62) may be calculated in advance, and it is sufficient to execute only equation (63) during operation. The coefficients $k_x$, $k_y$, and $k_0$ are stored model parameters, and $k_x$, $k_y$, and $\theta_i$ are the instantaneous result of the electric current measurement and anisotropy identification during operation.

In some embodiments, the position assignment coefficients $k_x$, $k_y$, and $k_0$ are calculated for multiple q-current values only once after the initial determination of the inductances $L_{dd0}$, $L_{qq0}$, and the PM flux value $\psi_{pm}$ (or the short-circuit electric current $i_{pm}$) by use of equations (58), (59), (60), (61), (62), (48), and (25), and stored as a table across the electric current. During operation, it is then sufficient to select/interpolate the coefficients $k_x$ ($i_\parallel$) that match the instantaneous electric current value and to assign the rotor position by use of equation (63).

1.3.2 Search Approach

In some embodiments, the measured electric current and a variable rotor position estimated value ($\hat{\theta}_r$) are supplied to the anisotropy model (for example, $y_\Delta^s(\theta_r,\ i_s^s)$ or $y_\Delta^{ii}(\theta_r,\ i_s^s)$), this estimated value being varied in such a way that the model makes the best possible match with the instantaneous anisotropy measured value ($\tilde{y}_\Delta^s$ or $\tilde{y}_\Delta^{ii}$, for example).

For this purpose, for the position assignment a search may be made during operation for, for example, the point on the SFC model trajectory $y_\Delta^{ii}(i_\parallel)$ that is near the measured value $\tilde{y}_\Delta^{ii}$, and the associated position value may be used as the estimated value. For example, in accordance with equation (58), the model $f_s(\cdot)$ based on equation (48) is now considered with a variable rotor position value $\theta_r$:

$$\gamma_{\Delta M}^{ii}(\theta_r) = f_s\left(\theta_r - \theta_i,\ \begin{bmatrix} i_\parallel \\ 0 \end{bmatrix}\right), \tag{64}$$

$\theta_i$ and $i_\parallel$ are measured values during operation, and $\theta_r$ is varied in such a way that the model makes the best possible match with the instantaneous measured value $\tilde{y}_\Delta^{ii}$. In some embodiments, the variation for the best possible match corresponds to a minimization of the interval between the modeled value and the measured value:

$$\min_{\hat{\theta}_r} |\tilde{y}_\Delta^{ii} - y_{\Delta M}^{ii}(\hat{\theta}_r)|^2. \quad (65)$$

The extreme point that is found may subsequently be taken on as the estimated value $\hat{\theta}_r$. For example, a gradient descent method may be used for the minimization:

$$\frac{d\hat{\theta}_r}{dt} = -k_f \frac{\left|\tilde{y}_\Delta^{ii} - y_{\Delta M}^{ii}\left(\hat{\theta}_r + \frac{h}{2}\right)\right|^2 - \left|\tilde{y}_\Delta^{ii} - y_{\Delta M}^{ii}\left(\hat{\theta}_r - \frac{h}{2}\right)\right|^2}{h} \quad (66)$$

The pre-exponential factor $k_f$ may scale the bandwidth of the tracking of $\hat{\theta}_r$, for example as a function of the position dependency $$\frac{\partial y_{\Delta M}^{ii}}{\partial \theta_r}.$$

Experimental Results

FIGS. 7a, 7b, 7c, 7d, 7e, and 7f verify the saturation assumptions for the fundamental wave inductance and the anisotropic shift, based on three geometrically isotropic (SPM) and three geometrically anisotropic (IPM) synchronous machines from six different manufacturers, using different values for the nominal power and the anisotropy ratio (SR). The vertical dotted lines, which denote nominal load, set the illustrated overload region and the point with short-circuit electric current ($i_q/i_{pm}$=1) in relation to one another.

For all machines, using the saturation assumption, the estimation errors caused by the fundamental wave inductance are greatly reduced compared to operation in which the saturation is disregarded, i.e., with constant parameter $L_q$. For all SPMs, in the range of fourfold overload which is relevant in practice, this estimation error does not exceed an error threshold of five electrical degrees, whereas errors up to 200 occur with constant $L_q$. For IPMs these estimation errors are greater (<ten electrical degrees in the illustrated load range) than for SPMs, but still much less than with operation at constant $L_q$. Therefore, use of the saturation assumption of the fundamental wave inductance may also be meaningful for geometrically anisotropic machines.

For geometrically isotropic machines, using the saturation assumption, the estimation errors caused by the anisotropic shift are greatly reduced compared to operation in which the saturation is disregarded, i.e., with direct use of the anisotropic angle as the rotor position value. For SPMs, this estimation error using the saturation assumption generally remains less than seven electrical degrees, whereas errors up to 60° occur with $\theta_{ar}$=0. However, SPM1 represents a more difficult case in which the estimation error increases up to 15°, even with the saturation assumption. In contrast, for IPMs these anisotropy estimation errors are not only much greater than for SPMs, but also often much larger in absolute value than when the anisotropic angle is directly used as the rotor position value. Therefore, use of the saturation assumption for the anisotropic shift is not meaningful for geometrically anisotropic machines.

Figure 8A:
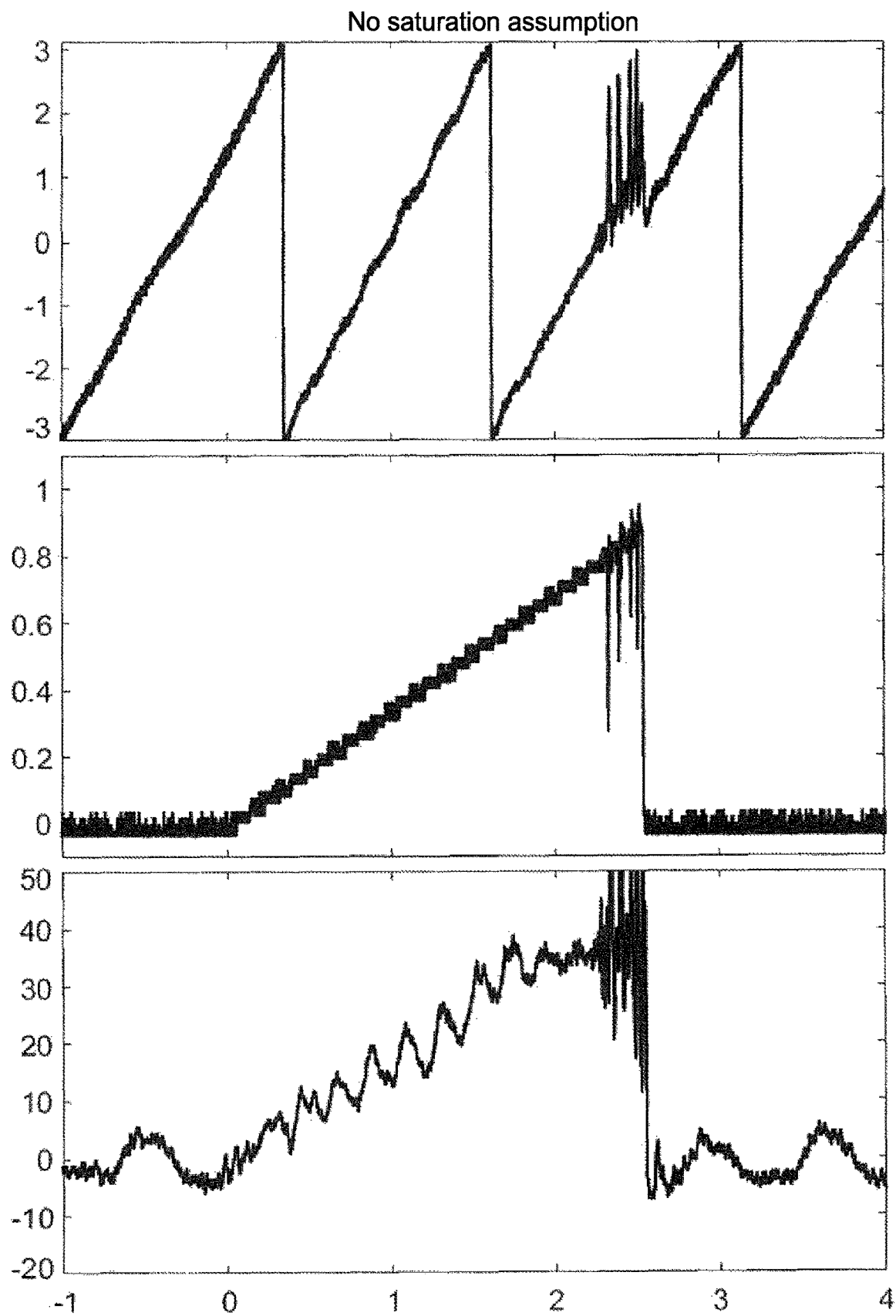
FIGS. 8a, 8b, and 8c show experimental results of the closed sensor-less control loop, with SPM3 in each case plotted as a function of time in seconds; in each case at the top: the estimated rotor position $\hat{\theta}_r$ in [rad]; in each case at the vertical center: the q-current in estimated rotor coordinates $i_q/i_{pm}$, and in each case at the bottom: the anisotropy-based estimation error $\hat{\theta}_r - \theta_r$ [° el]
Figure 8B:
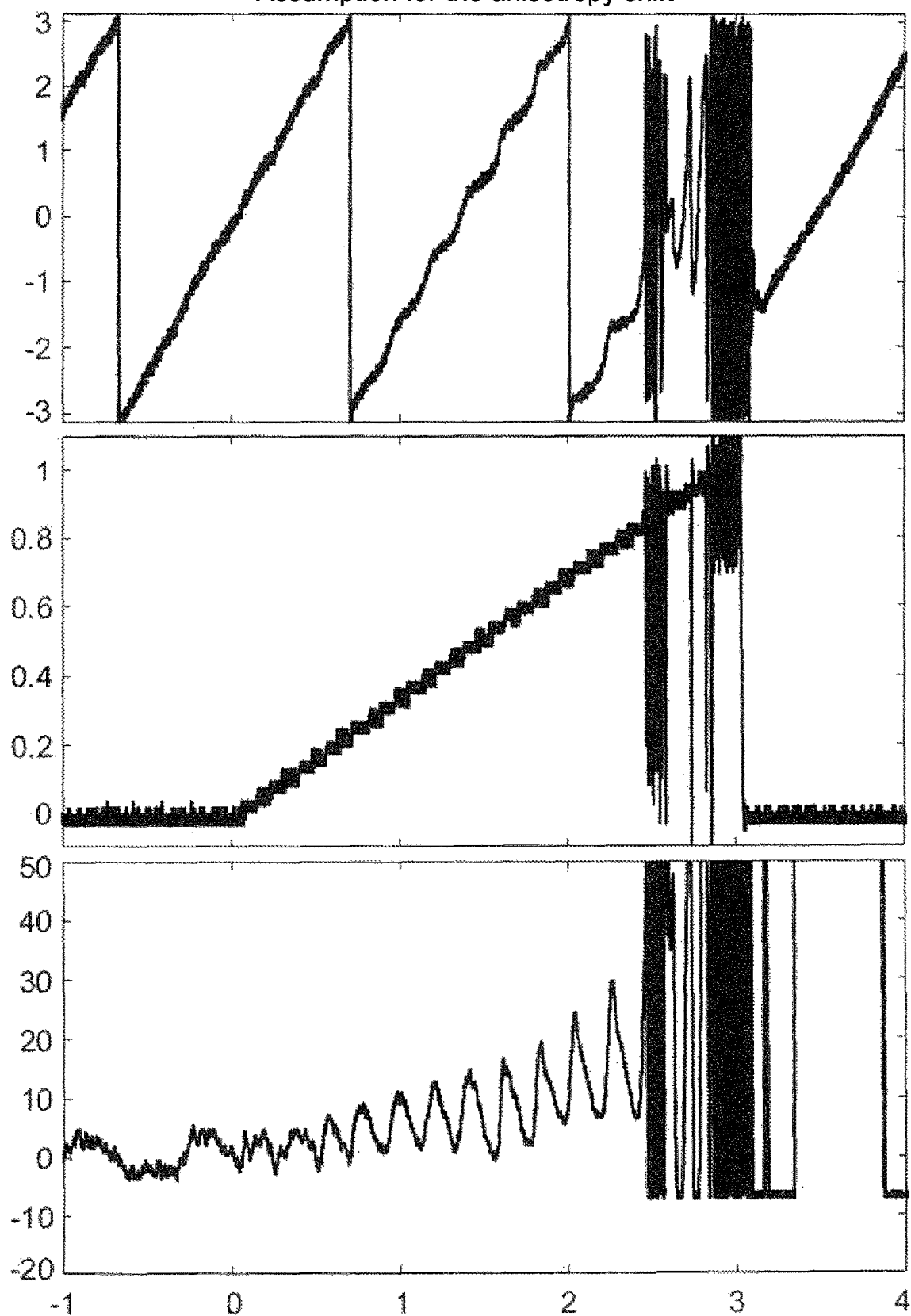
Figure 8C:
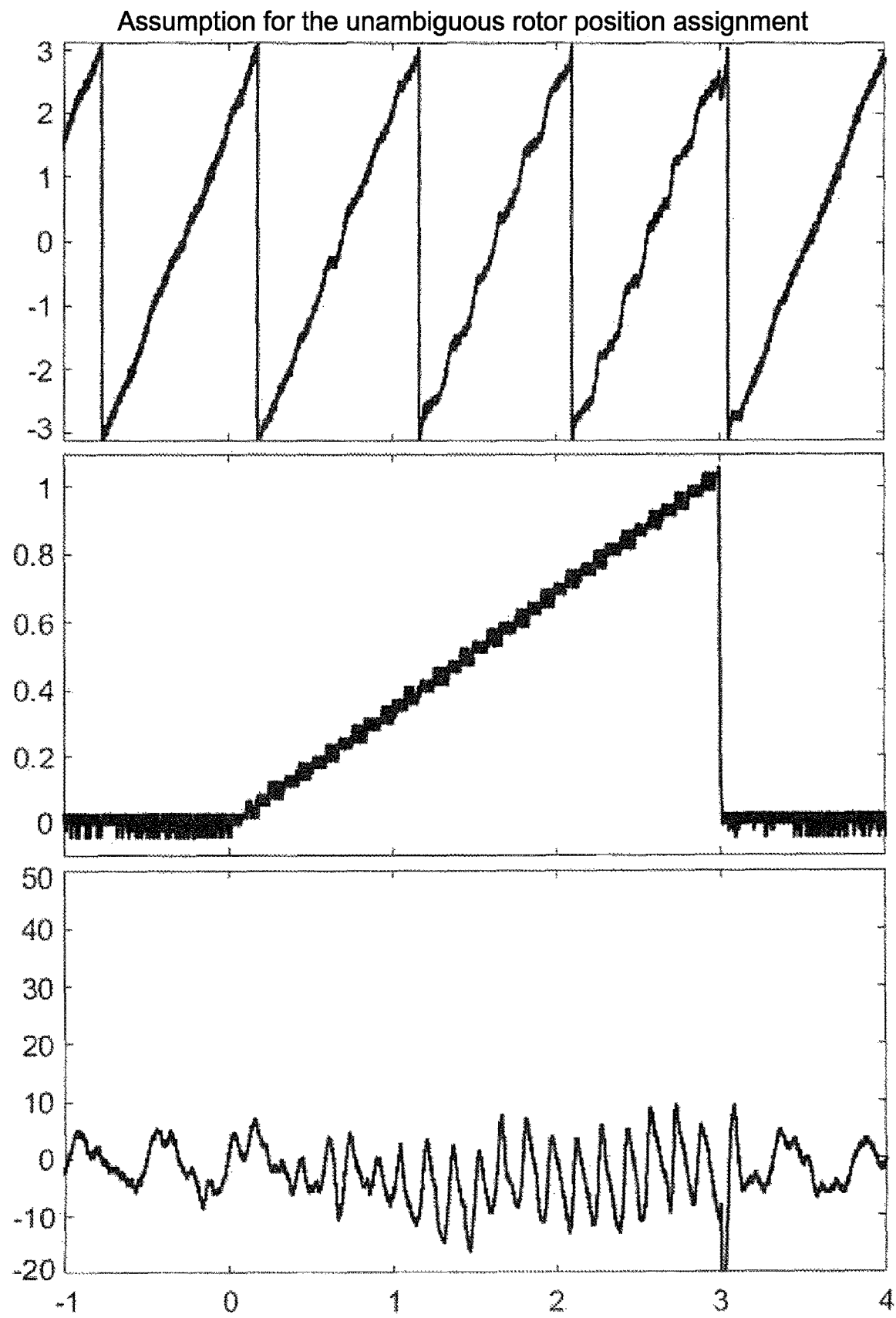

FIGS. 8a, 8b, and 8c compare the experimental results from sensor-less operation with the geometrically isotropic machine SPM3, with parameterization and without the saturation assumption, with the anisotropic shift assumption, and with the assumption for unambiguous rotor position assignment according to the exemplary embodiment in sub-section 1.3.1 above. In all cases, SPM3 was driven slowly by a load machine, and its rotor position was estimated based solely on anisotropy and used for transformation of the field-oriented electric current control. The q setpoint electric current was slowly increased beginning at t=0, so that nominal electric current was reached at approximately 0.6 s, and the short-circuit current $i_{pm}$ was reached at approximately three seconds.

Without the saturation assumption (FIG. 8a), the average estimation error (with harmonics masked) rapidly increases, already exceeds 10 at nominal electric current, and the control loop becomes unstable before the short-circuit electric current is reached. With the presented assumption for the anisotropic shift (FIG. 8b), the average estimation error does not exceed the 10 threshold until approximately three times the nominal electric current and is therefore still usable for efficient electric current control, even at higher torques. However, in this case as well, the control loop becomes unstable before the short-circuit electric current is reached, due to the fact that the relationship between the anisotropic angle and the rotor position is ambiguous (bibliography reference [34]).

With the presented assumption for unambiguous rotor position assignment (FIG. 8c), the average estimation error remains less than 10° over the entire load range, and is thus usable, without torque limitation, for efficient current control. In addition, the control loop does not become unstable, even at high loads, due to the fact that the causes of this type of association, described in bibliography reference [34], are not applicable. In all cases, however, second and sixth harmonics are observed in the estimated rotor position and particularly in the estimation error; these are caused by stator-fixed, negative fourth anisotropy harmonics (bibliography reference [32]), not taken into account in the presented method. However, additionally taking these or other harmonics into account is not ruled out for any of the presented embodiments.

Further aspects relate to:

(i) A device for controlling and regulating a polyphase machine, comprising a stator and a rotor, having an apparatus for detecting the number of phase currents, and having a controller for controlling the PWM (pulse-width-modulated) converter, which is configured and designed to carry out the method as described above; and (ii) A synchronous machine comprising a stator and a rotor with or without permanent magnets, with a device for control and/or regulation as described in above item (i).

SUMMARY

The present established highly efficient control of electric machines presumes that the rotor angle is known at any point in time, i.e., is generally measured. Without this knowledge, only control methods having much less efficiency can be used. The measurement takes place during operation by means of a sensor that is mounted at the rotor shaft, the so-called rotor position sensor, or sensor for short.

Sensors have a number of disadvantages such as increased system costs, reduced robustness, increased likelihood of failure, and fairly large space requirements, which has prompted interest by the major industrial sector in obtaining the angle signal without using a sensor, and to use it for efficient control.

Methods that allow this are referred to as "sensor-less" control, and are divided into two classes:

1. Fundamental wave methods evaluate the voltage induced by movement. At average and high rotational speeds, they provide very good signal properties, but they fail in the lower rotational speed range, in particular at a standstill.

2. Anisotropy-based methods evaluate the position dependency of the inductance of the machine, for which reason no rotational speed is necessary. However, they have numerous problems and difficulties, which explains why many applications thus far require a position sensor (with its drawbacks).

Both method classes require certain magnetic parameters of the machine to allow calculation of the rotor position from the voltage and current. However, due to magnetic saturation, these parameters are a function of the energization state. The quality and stability of the position estimation at high loads thus depend on the accuracy of the knowledge of the saturation behavior of the parameters.

For a machine type, the saturation behavior may either be derived with average accuracy based on the data of the computer-assisted machine structure, or experimentally determined with high accuracy on a test stand that includes a position sensor and load machine. Frequently, however, neither option is available, for example when an unknown synchronous machine is connected to a converter and the best possible control results are to be achieved based on brief initialization tests. Due to the fact that these tests are often also to be torque-free, a direct measurement of the saturation behavior is not always possible.

The embodiments described here combine certain physical properties of a synchronous machine with one another in such a way that that rules may be derived in order to deduce, based on measured values obtained in the torque-free state, the saturation behavior under load all the way to multiples of overload. This now allows even unknown synchronous machines to be stably and efficiently controlled over the entire rotational speed and load range all the way to multiples of overload without a position sensor after a brief, torque-free initialization measurement, without a test stand (a typical requirement in the field).

BIBLIOGRAPHY

[1] R. Wu und G. R. Slemon, "A permanent magnet motor drive without a shaft sensor," IEEE Trans. on Industry Applications, pp. 1005-1011, September 1991.

[2] T. Furuhashi, S. Sangwongwanich, and S. Okuma, "A position-and-velocity sensorless control for brushless DC motors using an adaptive sliding mode observer," IEEE Trans. on Industrial Electronics, pp. 89-95, April 1992.

[3] J. Hu, C. Romenesko and A. L. Markunas, "Shaft sensorless angular position and velocity estimation for a dynamoelectric machine based on extended rotor flux," U.S. Pat. No. 7,072,790, Jul. 4, 2006.

[4] Z. Q. Zhu, Y. Li, D. Howe, C. M. Bingham, and D. Stone, "Influence of Machine Topology and Cross-Coupling Magnetic Saturation on Rotor Position Estimation Accuracy in Extended Back-EMF Based Sensorless PM Brushless AC Drives," IEEE Industry Applications Annual Meeting, New Orleans, 2007.

[5] H. Nagura, Y. Iwaji, J. Nakatsugawa, and N. Iwasaki, "Control apparatus for synchronous motor," EP Patent Publication No. 2 290 806 A2, Aug. 27, 2009.

[6] M. Schrödl and R. Ensbacher, "Process and Circuits For Determining Machine-Related Electromagnetic And Mechanical State Variables On Electrodynamic Induction Machines Supplied Via Converters," WO 1992 019038 A1, Apr. 8, 1992.

[7] P. L. Jansen and R. D. Lorenz, "Transducerless position and velocity estimation in induction and salient ac machines," IEEE Trans. on Industrial Applications, vol. 31, p. 240-247, 1995.

[8] M. J. Corley and R. D. Lorenz, "Rotor position and velocity estimation for a salient-pole permanent magnet synchronous machine at standstill and high speeds," IEEE Trans. on Industrial Applications, vol. 34, p. 784-789, 1998.

[9] K. Ide, "Magnetic pole position estimating method and control apparatus for synchronous motor," U.S. Pat. No. 6,801,011, Mar. 26, 2001.

[10] N. Bianchi and S. Bolognani, "Influence of rotor geometry of an interior PM motor on sensorless control feasibility," in IEEE Conf. IAS Annual Meeting, 2005.

[11] T. Frenzke, "Impacts of cross-saturation on sensorless control of surface permanent magnet synchronous motors," in Conf. EPE, Dresden, 2005.

[12] P. Balazovic and R. Filka, "Motor controller for determining a position of a rotor of an AC motor, AC motor system, and method of determining a position of a rotor of an AC motor," U.S. Pat. No. 8,217,605, Nov. 10, 2000.

[13] E. Yamada and Y. Kawabata, "Method of controlling operation of synchronous motor and motor control apparatus for the same," U.S. Pat. No. 5,969,496, Jun. 23, 1997.

[14] S. Chai, B. Lee, J. Hong, S. Sul, and S. Kim, "Design of IPMSM having high power density for position sensorless operation with high-frequency signal injection and the method of calculating inductance profile," in IEEE Conf. ICEMS, Beijing, 2011.

[15] A. Stirban, I. Boldea, and G. Andreescu, "Motion-Sensorless Control of BLDC-PM Motor With Offline FEM-Information-Assisted Position and Speed Observer," IEEE Trans. on Industry Applications, pp. 1950-1958, November 2012.

[16] S. Ebersberger and B. Piepenbreier, "Identification of differential inductances of permanent magnet synchronous machines using test current signal injection," in International Symposium on Power Electronics, Sorrento, 2012.

[17] H. Peter and I. Hahn, "Determination of differential inductances of permanent magnet synchronous machines for sensorless control," in IEEE Conf. IEMDC, Niagara Falls, 2011.

[18] S. Villwock and H. Zatocil, "Device and method for identifying equivalent circuit parameters of an alternating current synchronous motor without using a rotary encoder," EP Patent Publication No. 2 421 147 A1, Aug. 16, 2010.

[19] Z. Gao, L. A. Turner, and R. S. Colby, "Methods and devices for estimation of induction motor inductance parameters," U.S. Pat. No. 8,373,379, Oct. 21, 2010.

[20] J. Boecker and H. Lorenz, "Method of measuring direction dependent saturated stray inductance in asynchronous motors using test pulses," DE Pat. No. 198 36 237, Aug. 5, 1998.

[21] J. Liu, M. M. Harbaugh, T. A. Nondahl, P. B. Schmidt, and S. Royak, "Method and apparatus for automatically identifying electrical parameters in a sensor-less PMSM," U.S. Pat. No. 8,228,013, Sep. 10, 2008.

[22] P. Landsmann and R. Kennel, "Q-axis pulse based identification of the anisotropy displacement over load for surface mounted PMSM," in IEEE Conf. SLED/PRECEDE, Munich, 2013.

[23] S. Ichikawa, M. Tomita, S. Doki, and S. Okuma, "Sensorless control of permanent-magnet synchronous motors using online parameter identification based on system identification theory," IEEE Trans. on Industrial Electronics, pp. 363-372, April 2006.

[24] M. A. Hamida, J. De Leon, A. Glumineau, and R. Boisliveau, "An Adaptive Interconnected Observer for Sensorless Control of PM Synchronous Motors with Online Parameter Identification," IEEE Trans. on Industrial Electronics, pp. 739-748, February 2013.

[25] T. Boileau, T. Leboeuf, B. Nahid-Mobarakeh, and F. Meibody-Tabar, "Online Identification of PMSM Parameters: Parameter Identifiability and Estimator Comparative Study," IEEE Trans. on Industry Applications, pp. 1944-1957, July 2011.

[26] S. Bolognani, M. Zigliotto, and K. Unterkotler, "On-line Parameter Commissioning in Sensorless PMSM Drives," in IEEE Conf. ISIE, Guimaraes, 1997.

[27] P. Landsmann, D. Paulus, and R. Kennel, "Online identification of load angle compensation for anisotropy based sensorless control," in IEEE Conf. SLED, Birmingham, 2011.

[28] K. Wiedmann and A. Mertens, "Novel MRAS approach for online identification of key parameters for self-sensing control of PM synchronous machines," IEEE Conf. EPE/PEMC, Novi Sad, 2012.

[29] M. Schrödl, "Detection of the rotor position of a permanent magnet synchronous machine at standstill," IEEE Conf. ICEM, p. 51-56, 1988.

[30] D. Paulus, P. Landsmann, and R. Kennel, "Sensorless field-oriented control for permanent magnet synchronous machines with an arbitrary injection scheme and direct angle calculation," IEEE Conf. SLED, pp. 41-46, 2011.

[31] P. Landsmann, "Method for the identification of the magnetic anisotropy of an electric rotating field machine," German Patent Publication DE 10 2015 217 986 A1, Sep. 18, 2015.

[32] P. L. S. K. a. R. K. D. Paulus, "Arbitrary injection for permanent magnet synchronous machines with multiple saliencies," in IEEE Conf. ECCE, Denver, 2013.

[33] P. Landsmann, D. Paulus, and S. Kühl, "Method and device for controlling a synchronous machine without a position encoder by means of a clear assignment of the admittance or inductance to the rotor position," German Patent Publication DE 10 2018 006 657 A1, Aug. 22, 2018.

[34] W. Hammel, P. Landsmann, and R. M. Kennel, "Operating point dependent anisotropies and assessment for position-sensorless control," in EPE/ECCE Europe, Karlsruhe, 2016.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for load-free determination of load-dependent position assignment parameters of a synchronous machine without using a position sensor, the synchronous machine having a stator and a rotor with or without permanent magnets, the method comprising:
   actuating the synchronous machine via clocked terminal voltages;
   measuring electric current of the synchronous machine responsive to the synchronous machine being actuated via the clocked terminal voltages;
   determining an inductance or admittance from each pair of clocked terminal voltage and measured electric current response;
   determining a load-free lowest differential inductance and a load-free highest differential inductance from the clocked terminal voltages and the measured electric current responses;
   predicting a magnetic saturation behavior of an absolute inductance and/or of a magnetic anisotropy of the synchronous machine under load based on the load-free lowest differential inductance, the load-free highest differential inductance, and a short-circuit electric current, wherein a value of the short-circuit electric current corresponds to an absolute value of a stator electric current that arises while the rotor is rotating with the synchronous machine being actuated with zero voltage; and
   using the predicted magnetic saturation behavior of the absolute inductance and/or of the magnetic anisotropy of the synchronous machine under load in a position sensor-free control operation for position assignment.

2. The method according to claim 1, wherein the predicted magnetic saturation behavior of the absolute inductance and/or of the magnetic anisotropy of the synchronous machine under load is compensated for in the position sensor-free control operation.

3. The method according to claim 1, wherein a each of the load-free lowest differential inductance and the load-free highest differential inductance corresponds to a derivative of a flux linkage as a function of an electric current in the operating point at zero current.

4. The method according to claim 1, wherein the load-free lowest differential inductance and the load-free highest differential inductance are the directionally dependent lowest and highest differential inductance values, respectively, of an operating point, the directional dependency corresponding to the magnetic anisotropy.

5. The method according to claim 1, wherein a saturation current vector is calculated by vectorial addition of a phase current vector and a short-circuit current vector, the short-circuit current vector having an absolute value of the short-circuit current and being oriented in the direction of the permanent magnet.

6. The method according to claim 5, wherein an anisotropic shift $\theta_{ar}$, as a parameter for evaluating the magnetic anisotropy, is calculated in such a way that with increasing phase current it increases such that the orientation of the anisotropy thus assumed corresponds to the direction of the saturation current vector.

7. The method according to claim 6, wherein a modeled anisotropy vector is constructed which has the length of the anisotropy absolute value and an orientation that is twice the anisotropic angle, the anisotropic angle corresponding to the sum of the rotor position and the anisotropic shift, so that the modeled anisotropy vector is described as a function of the phase current vector and the rotor position.

8. The method according to claim 5, wherein an anisotropy absolute value $Y_A$, as a parameter for unambiguously assigning the anisotropy rotor position, is calculated in such a way that, starting from its value $Y_{A0}$ effective at zero current, it progressively increases over the saturation current absolute value.

9. The method according to claim 8, wherein the progressive increase corresponds to an increase that is proportional to the saturation current absolute value to the third power.

10. The method according to claim 5, wherein an anisotropy absolute value $Y_{A0}$ that is effective at zero current is determined from the load-free lowest differential inductance and the load-free highest differential inductance.

11. The method according to claim 5, wherein a compensation of the position assignment takes place when the difference between the load-free highest differential inductance and the load-free lowest differential inductance is less than 20% of their sum.

12. A device for controlling and regulating a polyphase machine having a stator and a rotor, the device comprising a controllable PWM converter for outputting clocked terminal voltages, an apparatus for detecting the number of phase currents, and a controller for controlling the PWM converter, wherein the controller is configured to perform the method according to claim 1.

13. A synchronous machine having a stator and a rotor with or without permanent magnets, the synchronous machine comprising the device according to claim 12.

14. A method for load-free determination of load-dependent position assignment parameters of a synchronous machine without using a position sensor, the synchronous machine having a stator and a rotor with or without permanent magnets, the method comprising:
actuating the synchronous machine via clocked terminal voltages;
measuring electric current of the synchronous machine responsive to the synchronous machine being actuated via the clocked terminal voltages;
determining an inductance or admittance from each pair of clocked terminal voltage and measured electric current response;
determining a load-free lowest differential inductance and a load-free highest differential inductance from the clocked terminal voltages and the measured electric current responses;
predicting a magnetic saturation behavior of an absolute inductance and/or of a magnetic anisotropy of the synchronous machine under load based on the load-free lowest differential inductance, the load-free highest differential inductance, and a short-circuit electric current, wherein the short-circuit electric current is calculated as the quotient of a permanent magnet flux linkage and a combination of the load-free lowest differential inductance and the load-free highest differential inductance; and
using the predicted magnetic saturation behavior of the absolute inductance and/or of the magnetic anisotropy of the synchronous machine under load in a position sensor-free control operation for position assignment.

15. The method according to claim 14, wherein the combination corresponds to an averaged value.

16. A method for load-free determination of load-dependent position assignment parameters of a synchronous machine without using a position sensor, the synchronous machine having a stator and a rotor with or without permanent magnets, the method comprising:
actuating the synchronous machine via clocked terminal voltages;
measuring electric current of the synchronous machine responsive to the synchronous machine being actuated via the clocked terminal voltages;
determining an inductance or admittance from each pair of clocked terminal voltage and measured electric current response;
determining a load-free lowest differential inductance and a load-free highest differential inductance from the clocked terminal voltages and the measured electric current responses;
predicting a magnetic saturation behavior of an absolute inductance and of a magnetic anisotropy of the synchronous machine under load based on the load-free lowest differential inductance, the load-free highest differential inductance, and a short-circuit electric current, wherein the absolute inductance is calculated in such a way that, starting from its value of the load-free highest differential inductance that is valid at zero electric current, with increasing electric current it drops so that upon reaching the short-circuit electric current it is equal to the average value of the load-free lowest differential inductance and the load-free highest differential inductance; and
using the predicted magnetic saturation behavior of the absolute inductance and/or of the magnetic anisotropy of the synchronous machine under load in a position sensor-free control operation for position assignment.

* * * * *